United States Patent [19]
Nemirofsky et al.

[11] Patent Number: 5,761,601
[45] Date of Patent: Jun. 2, 1998

[54] VIDEO DISTRIBUTION OF ADVERTISEMENTS TO BUSINESSES

[76] Inventors: Frank R. Nemirofsky, 71 Janis Ct., Danville, Calif. 94526; Greg James, 1467 E. Hollow Dale Dr., Salt Lake City, Utah 84121

[21] Appl. No.: 379,517
[22] PCT Filed: Aug. 9, 1993
[86] PCT No.: PCT/US93/07449
 § 371 Date: May 1, 1995
 § 102(e) Date: May 1, 1995
[87] PCT Pub. No.: WO94/03995
 PCT Pub. Date: Feb. 17, 1994

[51] Int. Cl.$^6$ .................................................. H04N 7/16
[52] U.S. Cl. .................. 455/3.1; 455/6.1; 455/6.2; 348/6; 348/10; 348/8; 348/9
[58] Field of Search .................. 455/3.1, 3.2, 4.2, 455/5.1, 6.1, 6.3, 6.2; 348/6, 12, 13, 10, 11, 906, 907, 8, 9; H04N 7/16, 7/173

[56] References Cited

U.S. PATENT DOCUMENTS

| | | |
|---|---|---|
| 4,028,733 | 6/1977 | Ulicki . |
| 4,720,873 | 1/1988 | Goodman et al. . |
| 4,724,491 | 2/1988 | Lambert . |
| 4,725,886 | 2/1988 | Galumbeck et al. . |
| 4,814,883 | 3/1989 | Perine et al. . |
| 4,916,539 | 4/1990 | Galumbeck . |
| 4,937,821 | 6/1990 | Boulton . |
| 5,029,014 | 7/1991 | Lindstrom . |
| 5,099,319 | 3/1992 | Esch et al. . |
| 5,119,188 | 6/1992 | McCalley et al. . |
| 5,151,782 | 9/1992 | Ferraro . |
| 5,155,591 | 10/1992 | Wachob . |
| 5,200,825 | 4/1993 | Perine ........................ 358/181 |
| 5,216,515 | 6/1993 | Steele et al. ................. 358/335 |
| 5,392,066 | 2/1995 | Fisher et al. ................. 348/8 |
| 5,424,770 | 6/1995 | Schmelzer et al. ........... 348/9 |
| 5,446,919 | 8/1995 | Wilkins ...................... 455/6.2 |
| 5,450,122 | 9/1995 | Keene ......................... 348/1 |

FOREIGN PATENT DOCUMENTS

| | | |
|---|---|---|
| 62-36932 | 2/1987 | Japan . |
| 62-235835 | 10/1987 | Japan . |
| 63-276337 | 11/1988 | Japan . |
| 01-103335 | 4/1989 | Japan . |
| 01-97028 | 4/1989 | Japan . |
| 01-220925 | 9/1989 | Japan . |
| 02-295240 | 12/1990 | Japan . |
| 03-70438 | 3/1991 | Japan . |
| 03-117123 | 5/1991 | Japan . |
| 03-145828 | 6/1991 | Japan . |
| 03-196726 | 8/1991 | Japan . |

*Primary Examiner*—John K. Peng
*Assistant Examiner*—Chris Grant
*Attorney, Agent, or Firm*—Townsend and Townsend and Crew LLP

[57] ABSTRACT

The present invention provides systems and methods for distributing full motion video media, usually in the form of advertisements to a plurality of businesses, such as retail stores that are dispersed over a wide geographical area. The programs are transmitted from a distribution center to a multitude of receiving sites via satellite and are receivable via antennae at the receiving sites. Television monitors located at selected points in the receiving sites display the programs to an audience, which usually will include shoppers in the course of shopping. The invention provides for customizing video programs for particular target audiences or markets, such that the series of programs played in one receiving site could be quite different from that played in another.

42 Claims, 14 Drawing Sheets

VIDEO DISTRIBUTION OF ADVERTISEMENTS TO BUSINESSES

This patent application is derived from International Application No. PCT/US93/07449, filed Aug. 9, 1993, which claims priority from U.S. application Ser. No. 07/926,664, filed Aug. 7, 1992, which is herein incorporated by reference in its entirety.

BACKGROUND OF THE INVENTION

The present invention relates generally to audio-visual media broadcasting and advertising. More specifically, the invention relates to satellite-based transmission systems for distributing point-of-purchase video advertising to retail stores.

Commercial network television has been recognized as a powerful and efficient medium for broadcasting advertising messages to a large, widely disbursed audience. As a result, network television traditionally has garnered a major share of advertising budgets. However, due to a variety of factors, commercial television advertising revenues have been dropping over the past several years, a trend which is expected to continue. One major drawback of television advertising is network television's ability to do nothing more than deliver a large number of impressions to a large and relatively undifferentiated audience. Advertising dollars are ineffectively spent on messages that reach the wrong audiences under the wrong circumstances. Further, national network television is well suited only for the limited number of product categories which are truly national in scope and relatively impervious to regional and seasonal variation. Moreover, the cost of multiple regional campaigns will often equal or exceed that of a national program.

Point of purchase promotion accomplishes what in-home television cannot, in large part because it is directed not toward passive, unreceptive viewers, but rather toward consumers who are actively making choices and seeking information. Ample evidence demonstrates consumers in a shopping environment are much more susceptible to televised messages than otherwise.

However, current point of purchase advertising programs have severe limitations. For the most part they are based on a static, print-oriented media comprised of signage or packing labels, with product messages lost in the clutter. On-site demonstrations or educational devices are often prohibitively expensive, take up valuable selling space and are limited to a store by store approach.

One known system of electronic point of purchase advertising utilizes silent electronic dot repeating message signs, similar to reader boards found in major airports and brokerage houses, in the high-traffic aisles of supermarkets. Such silent reader boards, with limited two-dimensional displays, do not have the effectiveness of television in catching and retaining viewer attention.

Another known variation on electronic point-of-purchase advertising utilizes electronic display screens such as liquid crystal displays on individual shopping carts which convey messages to the shopper. Such systems again do not have the effectiveness of television, and further require a great deal of maintenance down-time due to their susceptibility to damage.

Other known systems have used satellite-transmitted television to broadcast advertising into supermarkets. However, such systems are typically based on commercial network programming and have typically located television monitors only at checkout counters. Further, known satellite-based systems do not permit on-line selective customizing of promotional messages by aisle, store, chain, geographic area or demographic profile.

SUMMARY OF THE INVENTION

The present invention responds to the need for an effective and cost-efficient point-of-purchase promotional medium. The invention provides a method and apparatus for distributing and broadcasting a customized video program from a distribution center to a plurality of geographically dispersed receiving sites. In a first embodiment, entertainment-based commercial promotional programming in full motion video format is broadcast via satellite to the point of purchase in retail outlets nationwide. The signal is received through an antenna at each location and broadcast throughout the store by monitors preferably located over the aisles and on the major walls. The location of monitors and the volume level of the speakers are preferably designed to unobtrusively blend in with each stores decor and enhance its aesthetics while being easily visible to shoppers as they move through the aisles.

A unique aspect of the invention is its capability for on-line creation of audio-visual programs customized for individual retail chains, stores, or ultimately aisles within a store, as well as for particular geographic areas and times of day. Unique programs tailored to a particular demographic market are assembled on-line and broadcast simultaneously to a multitude of different locations. This feature eliminates the need for producing separate video programs on separate videotapes for each customized program desired, and requires little or no operational intervention of personnel at the store.

In a first embodiment, the invention provides a video media distribution network comprising a distribution center having means for transmitting a network-wide video program and market specific segments to a plurality of receiving sites each having an associated address. The market-specific segments each include a destination address and a set of control data encoded into the segments. The receiving sites comprise means for receiving the network-wide video program and market-specific segments, means for reading the destination address in the market-specific segments, means operative when the destination address matches the associated address of the receiving site for inserting the market-specific segments into the network-wide video program according to commands contained in the control data to produce a customized program, and means for displaying the customized program.

In a further embodiment, a network-wide program is transmitted from the distribution center over a first channel and a series of market-specific segments are transmitted over one or more additional channels. Each market specific segment is assigned an address and a package of control data encoded into a known data location in the video signal. Receivers in each retail store receive the signals for both the network-wide program and market-specific segments, preferably being transmitted via satellite. An insertion control unit in the retail store reads the address in each market specific segment to determine whether the segment is intended to be played in that store. Until such a segment is identified, the insertion control unit directs the receiver to display the network-wide program on the first channel. When the address of a market-specific segment corresponds to the store, the insertion control unit reads the control data in the segment. A switching command contained in the control data will direct the receiver to switch to another channel to play the market-specific segment.

The network-wide and market-specific segments may be transmitted in either analog or digital signals. Usually, if analog signals are used, at least two transponders of a satellite are utilized, one for the network-wide program and a second for a series of market-specific segments. If digital signals are used, on the other hand, a single transponder of the satellite may be used. Usually, the digital signals are compressed in the distribution center using digital compression techniques. Depending upon the degree of compression, up to ten or more digital channels may be broadcast over a single satellite transponder. One digital channel is usually used for the network-wide program, and the remaining digital channels may then be used for the market-specific segments.

At the receiving site, in the analog embodiment, the insertion control unit directs the receiver to tune into either the first channel over the first transponder, or the second channel over the second transponder, depending upon the switching command of the market specific segments. In the digital embodiment, the insertion control unit may direct the receiver to switch among the digital channels while remaining tuned to the same transponder, or, where multiple transponders are utilized, to switch among various transponders.

The switching commands and other control data are usually encoded into both the market specific segments and the network-wide program so that the code will be available for detection by the insertion control unit regardless of the channel to which the receiver is tuned or switched at the time. The control data precedes the market specific segment to which it is assigned, permitting the data to be read by the insertion control unit, which then directs the receiver to retune or switch to the appropriate channel if the switching command so instructs. In the analog embodiment, the switching command and other control data are usually carried in a vertical blanking interval in the signal. In the digital embodiment, the control data are preferably encoded in a separate channel reserved for such data.

The invention further affords communication between the advertising distribution network and host computers in each retail location or a central computer at a remote site. This is particularly useful for product promotions and pricing changes, wherein a network advertiser offers a reduced price, coupon, two-for-one sale, or other such promotion. Such promotional information may be conveyed to the distribution network from an organization's central computer, carried in the control data with the video signal so that the controller in each store may read the information and communicate it to the store's host computer. The host computer may then automatically adjust prices at the cash registers or notify cashiers of the promotion.

Because of its ability to tailor its commercial messages to particular chains, stores, aisles, times of day and geographic regions, the distribution network of the present invention provides advertisers the capability to reach target audiences with customized messages. Further, such customized programming is assembled on-line at each receiving site according to control data encoded in the video signal, eliminating the need for pre-assembly of multiple unique programs, or the involvement of personnel at the receiving sites.

The second embodiment of the present invention is similar to the first embodiment. Differences include the additions of (1) an information trafficking system, (2) a distributed audio system, (3) a live interrupt feature and (4) a receiver. In order to incorporate these additions such that they are fully utilized, the network-wide video program described above includes regional-specific segments which further facilitate the ability to tailor messages to particular chains, stores, and geographic regions. Moreover, digital compression is utilized in this second embodiment.

The information trafficking system in the second embodiment uses a wheel concept to determine the commands contained in the control data which continually produces the sequence of the regional-specific and the market-specific segments within the customized program. In addition, the trafficking system manages the information in the network and generates bills from information which it has gathered and consolidated.

The distributed audio system provides audio control assistance to the means for displaying the customized program by adjusting the level of audio in various areas of the retail store in response to the existing noise levels in various zones within the receiving sites.

The live interrupt feature allows unanticipated segments to interrupt the customized program. These unanticipated segments are typically last minute additions which are transmitted from the distribution center with destination addresses. They are then received by the receiving sites, directly sent to the decoder, and then played. The interrupt feature permits the regional-specific and market-specific segments to be overridden by the unanticipated segments according to commands contained in the control data such that an altered customized program is produced and displayed.

The receiver stores the desired segments from the regional-specific, market-specific and unanticipated segments. In addition, this decoder facilitates the interrupt feature described above.

A further understanding of the nature and advantages of the invention may be realized by reference to the remaining portions of the specification and the drawings.

DESCRIPTION OF SPECIFIC EMBODIMENTS

The present invention provides a distribution network for transmitting real-time motion video, usually in the form of promotional advertisements, from a distribution center to a multitude of receiving sites, typically retail stores, dispersed over a wide geographic area. Preferably, programs are transmitted via satellite and are receivable via antennae at the receiving sites. Television monitors located at selected points in the receiving sites display the programs to an audience, which usually will include shoppers in the store. Importantly, the invention provides for customizing programs for particular target audiences or markets, such that the program played in one receiving site could be quite different from that played in another. Equally important is the invention's on-line insertion of custom, market-specific segments in a general, network-wide program without the need for pre-assembly of each unique program or operational involvement of personnel at the receiving sites.

Figure 1:
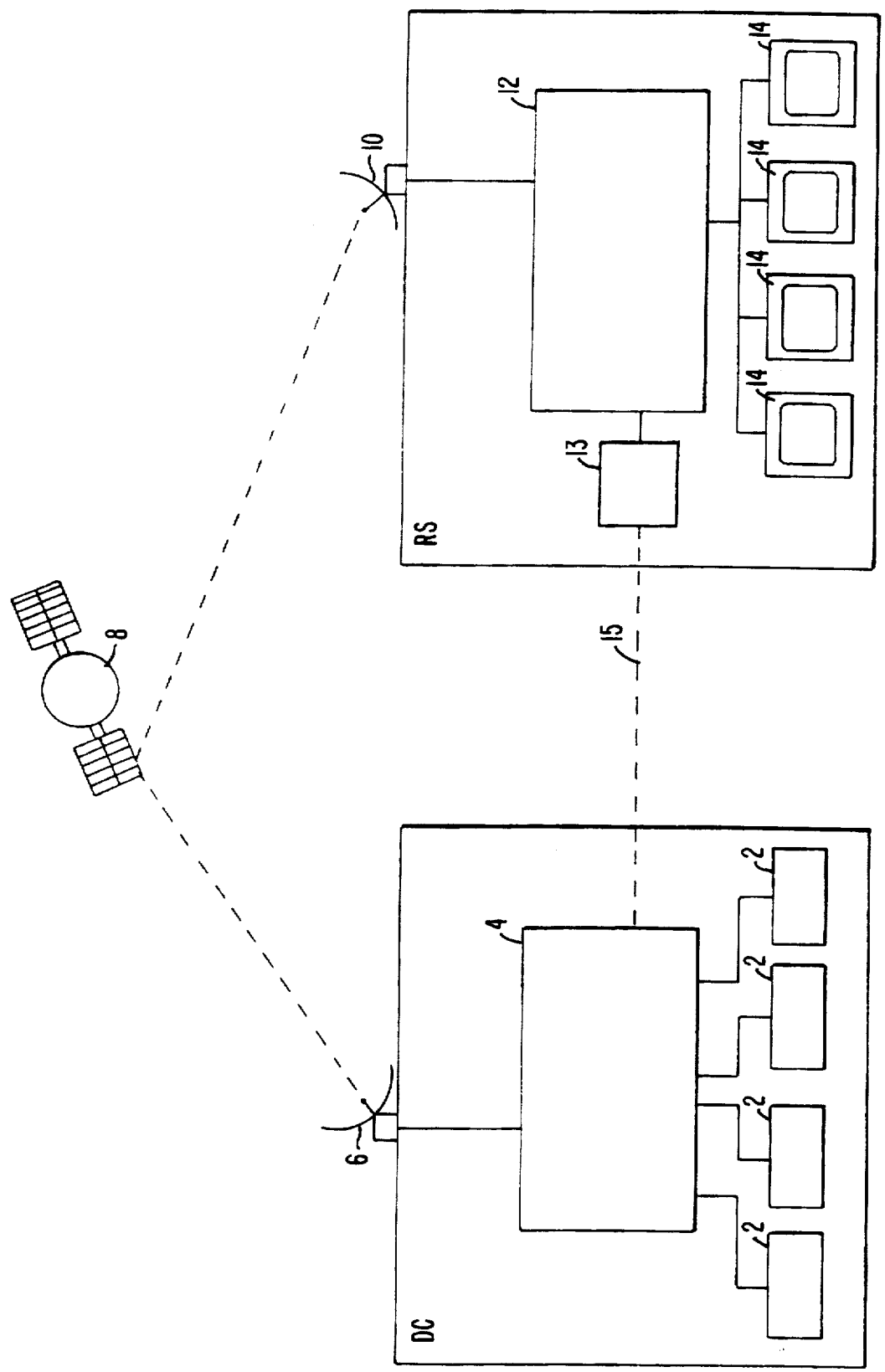
FIG. 1 is a block diagram of the video distribution network of the present invention.

In a first embodiment, as illustrated in FIG. 1, the distribution network includes a plurality of video program sources 2 coupled to an uplink control system (UCS) 4 in a distribution center D.C. UCS 4 performs the functions of accessing and playing back video source material, encoding the video signal with control data for directing switching equipment in receiving sites RS, and transmitting the video signal encoded with control data to a plurality of receiving sites RS via uplink antenna 6 and satellite 8. Each receiving site RS includes a downlink antenna 10 for receiving signals from the satellite, a decoding and switching system 12 which reads the control data and switches between video channels, and a network of televisions 14 for displaying video programs. A host computer system 13 is coupled to decoding and switching system 12 and communicates with UCS 4 via data communication link 15.

Figure 2:
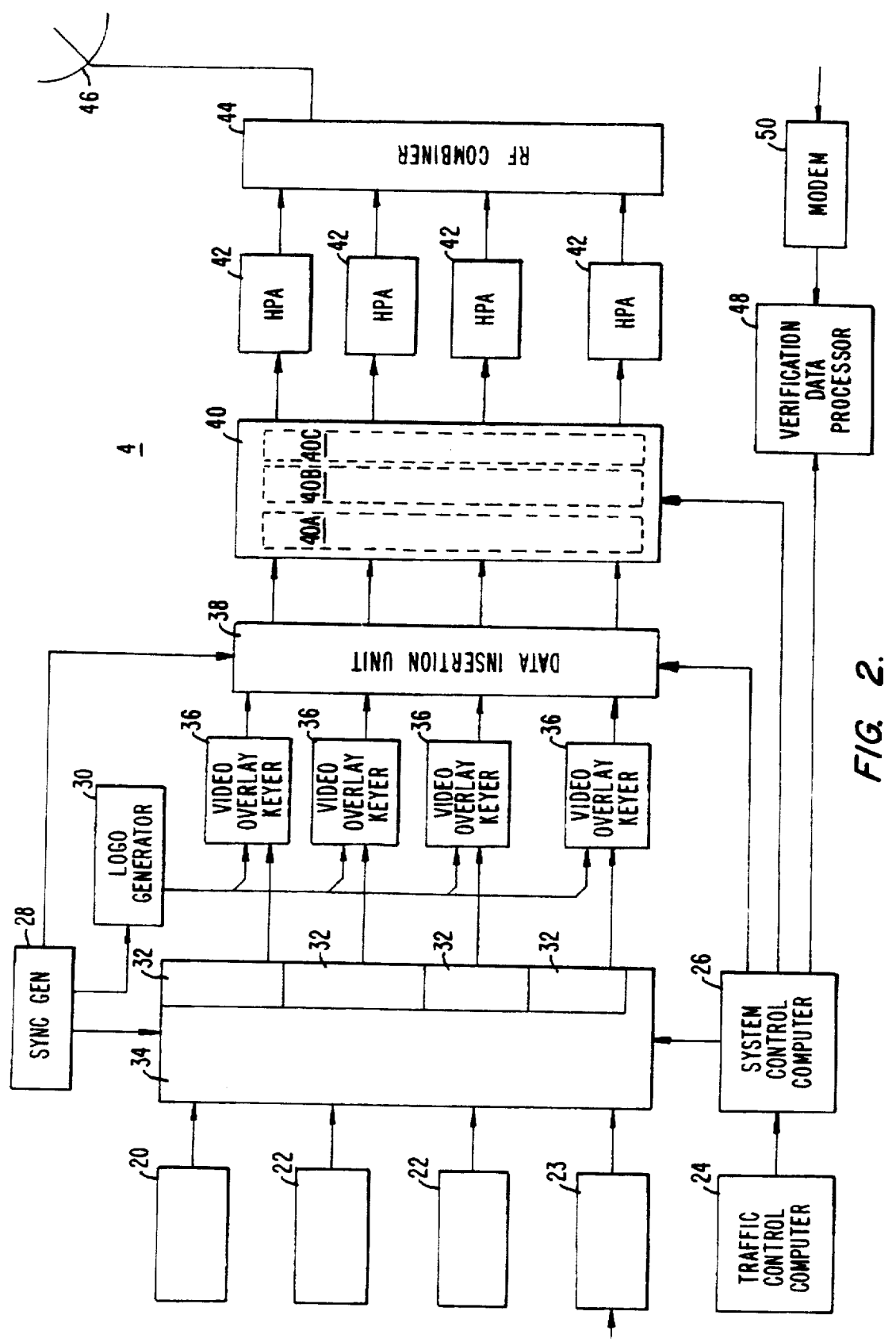
FIG. 2 is a block diagram of the uplink control system of the distribution network of FIG. 1.

The uplink control system 4 in the distribution center DC is illustrated in FIG. 2. A network-wide program 20, usually comprising a series of full motion video segments stored on video storage media such as video tapes or optical disks, is played on a video playback device 32, which will comprise one or more video cassette recorders (VCRs), optical disk (videodisk) players, or other conventional recording media playback devices, such as the Sony BVW-60 VCR or Pioneer VDR-V1000 Videodisc Player. The network-wide program is played over a first source channel of the network.

Market-specific segments 22 stored on video storage media are played on video playback devices 32 over one or more additional source channels. The network may further include a program source receiver 23 capable of receiving video segments transmitted to the distribution from remote locations, by e.g., satellite or cable.

It will be understood that the network-wide program 20 and the market-specific segments 22 are preferably in full motion video format, and include both an audio and video component recorded onto conventional recording media such as magnetic tape or optical disks. While the term "video" is used herein unaccompanied by the word "audio", the term "video" is intended to refer to recorded audio-visual media as in common usage, unless stated otherwise. The network-wide program 20 and market-specific segments 22 may further include computer graphics and other forms of audio-visual media.

Video playback devices 32 are coordinately controlled through a playback control unit 34, which may comprise, for example, a Sony Beta Cart 40 or Panasonic MARC II-100. Playback control unit 34 may be connected to a plurality of playback devices 32, and programmed to actuate selected playback devices upon receiving a signal from an external source, e.g. system control computer 26 (described below).

Uplink control system 4 further includes a sync generator 28 coupled to playback control unit 34 to provide a reference for synchronization purposes. Sync generator 28 ensures that the horizontal and vertical pulses of the video signals from playback devices 32, as well as signals generated by peripheral devices such as logo generator 30 and data insertion unit 38 (described below), are synchronized to facilitate combining signals from various sources. Sync generator 28 is preferably a commercially available product such as the Grass Valley Group 9510 or Lietch SPG-120N.

Sequencing, timing and synchronization of the network-wide program 20 and market-specific segments 22 are controlled by a system control computer 26, which is programmed through a traffic control computer 24. System control computer 26 and traffic control computer 24 may be Apple MacIntosh Quadras, IBM 386 or 486 Personal Computers, or other comparable computers of wide commercial availability. Traffic control computer 24 allows user input with respect to the sequencing, timing, and distribution of the market-specific segments and the network-wide program 20 (described more fully below), and outputs commands to system control computer 26 to selectively actuate video playback devices 32. Traffic control computer 24 is programmed so that system control computer 26 actuates video playback devices 32 to play a series of market-specific segments 22 over one or more source channels in a desired order and at the proper time, according to the desired position for insertion into the network-wide program 20. Traffic control computer 24 may further be programmed to assemble the network-wide program 20 by selectively actuating a plurality of video playback devices 32 such that a series of segments making up the network-wide program 20 is played over the network-wide program source channel.

In an exemplary embodiment, a logo generator 30 coupled to sync generator 28 generates a video overlay of a selected logo, such as that of a supermarket chain or the network operator, which is inserted at selected points in the network-wide program 20 and/or market specific segments 22 by video overlay keyers 36 coupled to video playback devices 32. Logo generator 30 may be, for example, a Texscan SG-4B or a Chyron Scribe. Video overlay keyers 36 may be commercially available products such as the Comprehensive Video PVK-1, or Graham-Patten Systems 1236.

In a first embodiment, video signals are transmitted in analog form throughout the distribution network. In the analog embodiment, a data insertion unit 38 is coupled to video playback devices 32 succeeding video overlay keyers 36. Data insertion unit 38 encodes a destination address along with a package of control data in the network-wide program 20 and market-specific segments. The destination address will correspond to one or more receiving sites, groups of receiving sites, or sub-parts of receiving sites in the network. The control data may include, as elaborated below, switching commands, program/segment storage commands, messages directed to a host computer at the receiving site, modem commands for a modem at the receiving site, receiving site control profile updates, and the like. Data insertion unit 38 operates under commands from system control computer 26, programmed through traffic control computer 24, which dictate what addresses and control data are to be assigned to each market-specific segment, and where the data should be inserted relative to the segment. Data insertion unit 38 is coupled to sync generator 28 to provide a synchronization reference for proper positioning of control data in the video signal.

In the analog embodiment, data insertion unit 38 preferably encodes the control data in a vertical blanking interval in the analog video signal. Alternatively, data insertion unit 38 may encode to control data into a separate data subcarrier channel. Usually, the data are encoded in both the network-wide program 20 and the market-specific segments at contemporaneous positions just preceding the market-specific segment, for reasons which will become apparent below. Analog data insertion unit 38 may be, for example, an Interactive Satellite VBI-1000 Data Transmission System, available from Interactive Satellite of Richardson Texas.

Upon leaving data insertion unit 38, network-wide program 20 and market-specific segments 22 require modulation for satellite transmission. In the analog embodiment, an uplink modulator 40 receives the network-wide program and market-specific segment signals and modulates them to a frequency appropriate for satellite transmission, usually in the KU-band or C-band. Uplink modulator may be a commercially available product such as the Scientific Atlanta 7555B Exciter.

In the digital embodiment, control data encoding is accomplished by an encoder 40C in uplink encoder/modulator 40. Encoder/Modulator 40 may be, for example, a Scientific Atlanta 7555B Exciter (with encoder option). Encoder/modulator 40 will include an analog-to-digital converter 40A to convert the analog signal produced by video playback devices 32 into digital signals.

Encoder/modulator 40 further includes a digital data compressor 40B for compressing the video data to an optimum quantity for maximizing transmissibility while maintaining sufficiently high image quality. Through known data compression techniques, up to ten or more digital source channels may be transmitted over a single satellite transmission channel (transponder).

Preferably, encoder/modulator 40 transfers the network-wide program 20 onto one digital source channel, while the market-specific segments 22 are transferred onto one or more additional digital source channels. Preferably, a digital source channel separate from those used for the network-wide program 20 and market-specific segments is reserved for control data. Under the direction of system control computer 26, encoder/modulator 40 inserts the control data onto this digital control data channel at a point just preceding the beginning of the corresponding market-specific segment.

Encoder/modulator 40 further includes a frequency modulator which modulates the digital signals to a satellite transmission frequency, which is usually in the KU-band or C-band.

HPAs 42 then amplify the video signals, whether digital or analog, to a power level appropriate for satellite transmission. HPAs 42 may be, for example, MCL TWTA Power Amplifier Systems.

An RF combiner 44 is coupled to HPAs 42, and combines the signals of separate source channels into a single transmission signal for transmission via satellite 8. In the analog embodiment, the network-wide program 20 is transmitted over a separate transmission channel—that is, over a different satellite transponder—than the market specific segments. Each source channel containing analog market-specific segments is transmitted over different transmission channels. RF combiner 44 may be a commercially available product such as the Specialty Microwave RF Combiner.

In the digital embodiment, the network-wide program 20 on a source channel as well as the control data carried on the digital control data channel, are preferably combined by RF combiner 44 into a single transmission signal for satellite transmission on one or more transponders.

An up-link antenna 46 of conventional construction, such as a Scientific Atlanta 7 Meter KU Band 4-Port Dish Antenna, is coupled to RF combiner 44 for transmitting the modulated video signals over one or more frequency modulated KU-band RF channels to transponder(s) on satellite 8, each transponder typically providing a bandwidth of 54.0 MHz.

Figure 3:
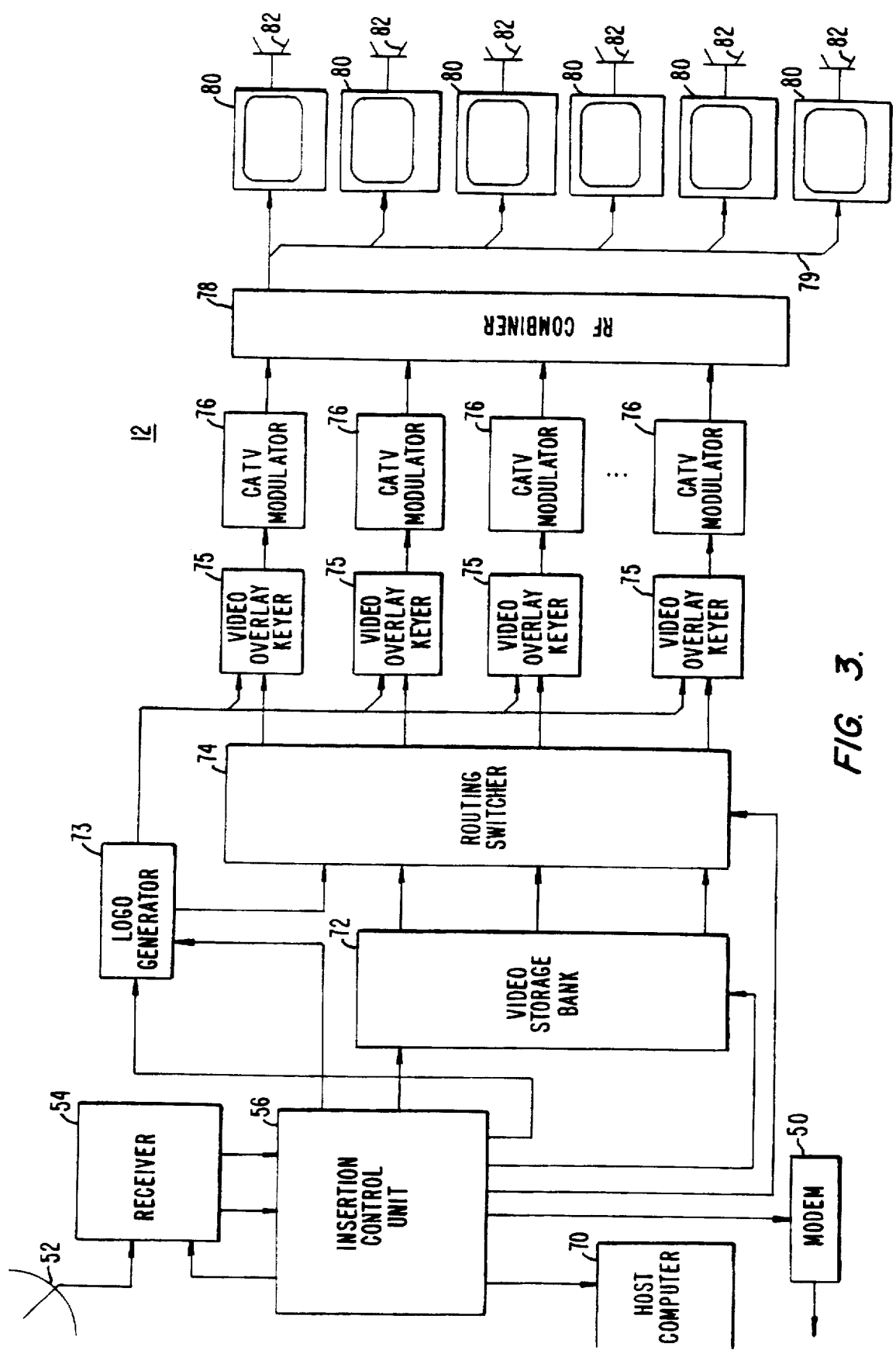
FIG. 3 is a block diagram of the decoding and switching system of the distribution network of FIG. 1.

Referring now to FIG. 3, the decoding and switching system 12 of each receiving site RS will be described. Transponder(s) on satellite 8 transmit the video signals over RF channels to down-link antenna 52, which may be, for example, a ChannelMaster SMC Series 1.8-meter Dish Antenna. Each receiving site has one such down-link antenna 52, typically at an exterior location such as the roof of the receiving site.

Figure 4:
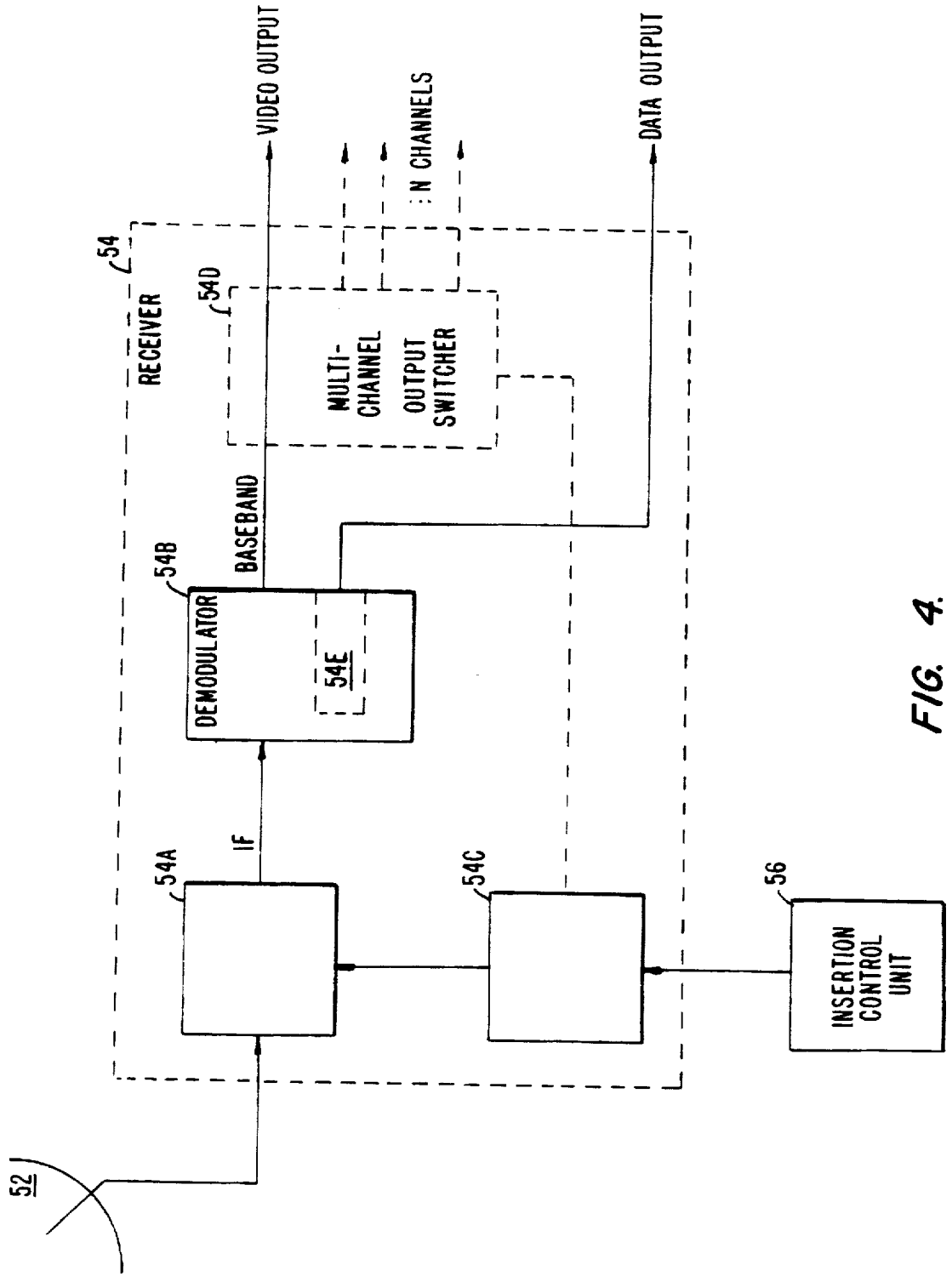
FIG. 4 is a block diagram of the receiver of the decoding and switching system of FIG. 3.

Down-link antenna 52 is coupled to a receiver 54, which may be, for example, a Drake ESR-1240 or General Instruments DSR-1000. As illustrated in FIG. 4, receiver 54 includes a tuner/RF converter 54A, which may be tuned to the appropriate frequency for reception of signals over the transmission channels from satellite 8. Tuner/RF converter 54A converts the RF signal received to an intermediate frequency (IF) signal. The IF signal is demodulated to a baseband in a demodulator 54B coupled to tuner/RF converter 54A, and output to insertion control unit 56 (FIG. 3).

In the digital embodiment, demodulator 54B will further include a digital data separator 54E which identifies the digital control data channel and extracts the control data therein. The digital control data are output to insertion control unit 56.

Receiver 54 also has a switching command decoder 54C coupled to insertion control unit 56 and tuner/RF converter 54A. The switching command decoder 54C receives a switching command from insertion control unit 56 as described below, and, in the analog embodiment, retunes tuner/RF converter 54A to the transmission channel specified in the command. In the digital embodiment, the switching command decoder 54C sends a switching signal to a multichannel output switcher 54D. Multichannel output switcher 54D responds to the switching signal by switching to the digital source channel specified in the switching command, with tuner/RF converter 54A remaining tuned to a particular transmission channel.

If multiple transmission channels (satellite transponders) are used to transmit digital signals, the switching command decoder 54C interprets the switching command from insertion control unit 56 to determine whether the specified channel is carried on a different transmission channel. If so, the switching command decoder 54C retunes tuner/RF converter 54A to receive the new transmission channel. In addition, switching command decoder 54C determines whether a different digital source channel is required and, if so, sends a digital source channel switching signal to multichannel output switcher 54D.

Figure 5:
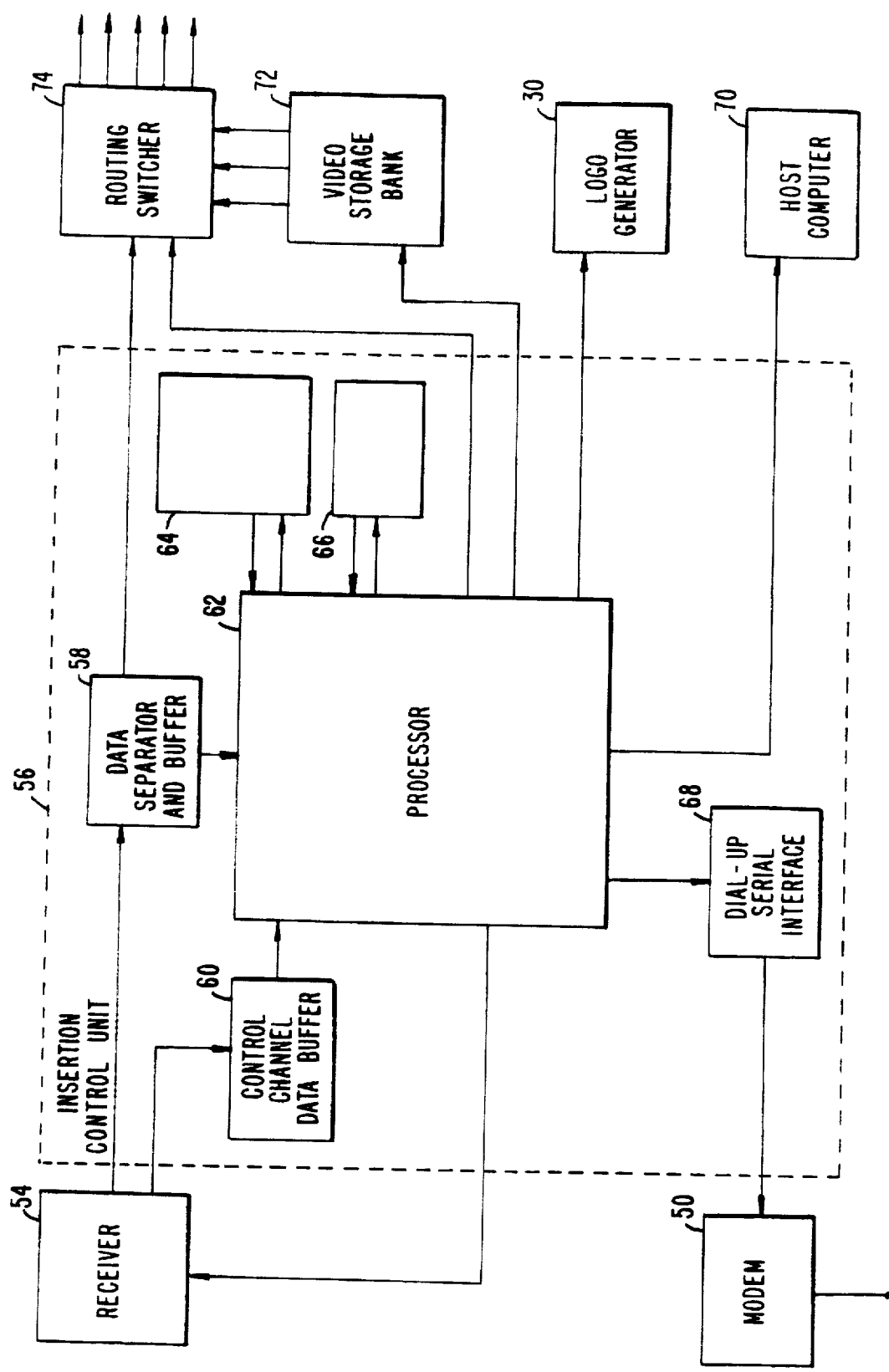
FIG. 5 is a block diagram of the insertion control unit of the decoding and switching system of FIG. 3.

As illustrated in FIG. 5, insertion control unit 56 includes a data separator and buffer 58 which, in the analog embodiment, extracts the destination address, switching command and other control data embedded in the video signal. In the digital embodiment, a control channel data buffer 60 receives control data from demodulator/digital data separator 54B, 54E in receiver 54. The address and control data are read by a processor 62, which is in communication with non-volatile memory units 64, 66 storing address and command data for the receiving site, as well as a software program (described below). Processor 62 compares the destination address read from the video signal and, if it matches that of the receiving site, processes the accompanying control data, as described more fully below.

In the analog embodiment, receiver 54 is tuned, in a default state, to receive the network-wide program 20 over the appropriate transmission channel, from a particular satellite transponder. When a market-specific segment is to be inserted into the network-wide program 20, a switching command will be contained in the control data in a vertical blanking interval in the network-wide program 20 preceding the point where the market-specific segment is to be inserted. Insertion control unit 56 reads the switching command and switches receiver 54 to tune to the transmission channel (satellite transponder) of the market-specific segment at the appropriate time. At the end of the market-specific segment, the insertion control unit 56 will retune receiver 54 back to the network-wide program channel, unless the switching command in a vertical blanking interval preceding the end of the market-specific segment indicates that the succeeding segment is also to be played at the receiving site.

In the digital embodiment, multiple source channels, including the network-wide program channel, market-specific segment channels and digital control data channel, may all be transmitted over the same transmission channel (i.e. through the same satellite transponder or a portion there of). Therefore, where a single satellite transponder is utilized, it is unnecessary to retune receiver 54 when switching between market-specific segments and the network-wide program. Insertion control unit 56 reads data contained in the digital control data channel to determine whether an upcoming market-specific segment is to be played at the receiving site. If so, insertion control unit 56 switches receiver 54 from the network-wide program 20 digital source channel to the appropriate market-specific segment digital source channel through multi-channel output switcher 54D, without retuning receiver 54 to a different satellite transmission channel. Insertion control unit 56 continues to read the digital control data channel to determine whether the succeeding market-specific segment is to be played at the location, or whether receiver 54 should be switched back to the network-wide program 20 digital channel at the end of the current segment. Where multiple transponders are utilized to transmit digital signals, of course, the receiver 54 will either switch to a different digital channel on the same transponder, or tune to a different transponder, depending upon which transponder a market-specific segment is carried.

As described above, the control data carried with the network-wide program 20 and market-specific segments may include various types of information in addition to switching commands. Such information may include, for example, program/segment storage commands, modem commands, messages directed to the store's host computer, control profile commands, and the like.

A program/segment storage command will direct processor 62 of the insertion control unit 56 to generate a storage command. The storage command will be transmitted to a video storage bank 72 where market-specific segments or portions of the network-wide program 20 may be stored and recalled for time-delayed playback. Storage bank 72 may comprise one or more VCRs, optical recording/playback devices, or other known data storage device, such as the Pioneer VDR-V1000 Videodisc Recorder or Sony BVW-60 VTR. The storage command will activate the storage bank 72 to store an upcoming market-specific segment or portion of the network-wide program 20, or to recall a stored segment from the storage bank 72 for insertion into the network-wide program 20 at a selected point.

A routing switcher 74 (FIG. 3), directed by storage commands from insertion control unit 56, selectively switches between stored segment sources and the network-wide program 20 or market-specific segments 22 received through receiver 54. Routing switcher 74 may be, for example, a Sierra Video systems Series 32 8×16 or Grass Valley Group TEN-20.

If processor 62 reads a modem command, it will activate a modem 50 through a dial-up serial interface 68. The modem 50 is in communication with UCS 4 in the distribution center via telephone lines, permitting information such as reception verification, failure notification, alarm messages or other receiving site-originated information to be conveyed to the distribution center. Modem 50 may be a commercially available, Hayes-compatible modem. The modem 50 will preferably be in communication with a verification data processing computer 48 in the distribution center (FIG. 2), which may be an Apple MacIntosh Quadra or IBM AS400 computer. Verification data processing computer 48 is further coupled to system control computer 26, which sends transmission record messages specifying the video programming and control data transmitted to each receiving site. The verification data processing computer 48 will receive verification data or other message data from the insertion control unit in the receiving site via modem 50, and compare this data with the transmission record messages from system control computer 26 to determine whether transmission was successful. The resulting data may be stored for statistical record-keeping and/or output to a display or printer.

A control profile command read by processor 62 refreshes a control profile stored in the memory unit of each insertion control unit. The control profile defines the operation of the insertion control unit 56 in response to reading particular codes in the control data. When a particular code contained in an insertion control unit's control profile is read from the control data in the video signal, it will trigger a set of commands stored in memory units 64,66 to be executed by the insertion control unit 56. This eliminates the need to send all such commands with the video signal. The control profile is important to the operation of the insertion control unit 56, and may be subject to corruption by hardware faults, power fluctuations or the like. Thus, the control profile may be periodically updated using control profile commands.

The control data received by insertion control unit 56 may also include commands directed to the receiving site's host computer 70. For example, supermarkets commonly have an on-site host computer to which the cash registers are linked. Product information such as pricing, promotions, quantities, in-store location, etc., is input to such a host computer and stored for reference or communicated to the registers. The registers may be automatically adjusted upon receiving such information, to reflect changes in price, discounts, "video coupon" offers, and the like. If processor 62 of insertion control unit 56 reads a host computer command among the control data in the video signal, the accompanying data will be transmitted to the host 70 from insertion control unit 56 via a data communication link.

Each channel transmitted from routing switcher 74 contains an assembled customized video program in the form it will be broadcast at the receiving site. The customized program comprises the program segments of the network-wide program, with selected market-specific segments inserted at various points therein. If the same program is to broadcast throughout the receiving site, the program is transmitted over a single channel from insertion control unit 56 or routing switcher 74. If a plurality of unique programs (e.g. aisle-specific programs) will be shown in the receiving site, each will be transmitted over a different channel from insertion control unit 56 or routing switcher 74.

Referring again to FIG. 3, insertion control unit 56 is coupled to video overlay keyers 75 and CATV modulators 76 succeeding storage bank 72 and routing switcher 74. Video overlay keyers 75, under the control of insertion control unit 56, insert a logo generated by logo generator 73, matching that produced by logo generator 30 in the UCS 4. Logo generator 73 and video overlay keyers 75 may be comparable to UCS logo generator 30 and video overlay keyers 36, described above.

CATV modulators 76 coupled to video overlay keyers 75 modulate the signal, whether analog or digital, to an appropriate frequency for local distribution at the receiving site through a cable network 79. CATV modulators 76 may comprise, for example, commercially-available products such as the Drake VM-200 or PICO MACOM M600.

CATV modulators are coupled to an RF combiner 78. RF combiner 78, which may be, for example, a Blonder-Tongue OC-8 or Pico Macom PHC-12, combines the channels (if more than one) to a single transmission signal for local distribution over the cable network 79. As in common cable television systems, each unique program channel occupies a discrete portion of the transmission signal, and remains identifiable. Televisions 80 in the receiving site are tuned to receive the cable transmission channel, and may be switched to display a particular cable program channel among those transmitted over the transmission channel. Televisions 80 may be any of a variety of commercially available products, such as the Sony 2710 or the Mitsubishi CS2710R. Also coupled to the cable network 79 of the receiving site are audio systems 82 for reproducing the audio signal in the network-wide and market-specific segments. Audio systems 82 may comprise, for example, the Anchor AN-1000 or BiAmp D-60 with JBL Control 1.

In a first embodiment of the distribution network, the receiving sites are retail stores, such as supermarkets. The network-wide program 20 and market-specific segments 22 will usually include commercial advertising, as well as entertainment, news, sports and educational programming. Televisions 80 will be positioned in visible locations throughout the stores, including overhead each aisle, near checkout counters, and along interior walls. Programs may include separate audio tracks in languages other than English, and televisions will have selectable bilingual capability.

Through the use of switching commands encoded in the satellite-transmitted video signals, and the multiple-channel cable network within each store, programs may be customized for individual retail chains, stores, sections of stores (e.g. produce or dairy) aisles, times of day, and geographic regions. Importantly, these customized programs are assembled automatically by receiver 54 switching among channels according to the switching commands read by the insertion control unit 56. In this way, a plurality of customized programs may be broadcast simultaneously without pre-assembly of each unique program at the distribution center, without requiring the use of numerous satellite transponders, and without involvement of personnel at the receiving site. Since the advertising may be highly targeted based on location, time of day, etc., the advertising will be significantly more valuable to advertisers from other commonly available media.

SOFTWARE ARCHITECTURE

The software architecture of the distribution network will be described with reference to FIGS. 6 to 8.

A. Uplink Control System Software

Figure 6:
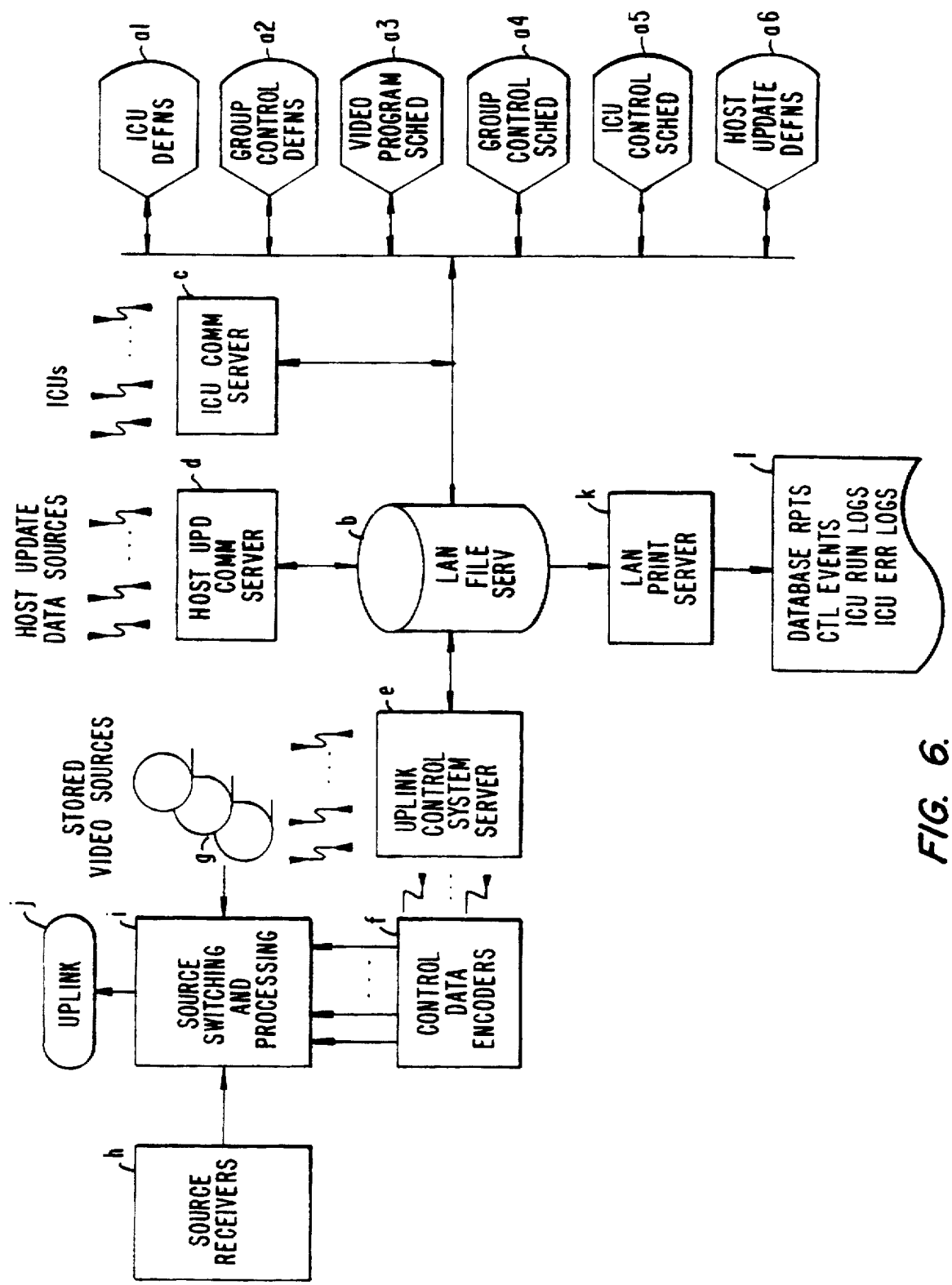
FIG. 6 is a data flow diagram of the uplink control system of FIG. 2.

The software controlling uplink control system (UCS) 4 is illustrated in FIGS. 6 and 7. Referring to FIG. 6, the software of uplink control system 4 provides for the following major subsystems: data entry and editing (a1 through a6); centralized data storage and file service (b); communication with the insertion control units in the receiving sites (c); communication with centralized or host computers of the receiving sites (d); uplink control system services (e); encoding of control data in the video signal (f); playback control of video source material on programmable video tape or disks (g); reception of satellite or terrestrial video signals (h); video source switching and processing (i); satellite uplink (j); and printing (k and l) for the database filesaver (b) and for verification and alarm messages collected from communicating with the insertion control units (c) and with the receiving site host computers (d).

A first embodiment of the UCS 4 employs a local area network (LAN) with the uplink control system services (e) residing on system control computer 26. The other major services on the LAN, namely, receiving site host communications, receiving site insertion control unit communications, data entry and editing, file services and print services are, in a first embodiment, also on separate computers, but other implementations could combine some or all of the illustrated servers into a minicomputer or mainframe computer. The LAN itself could be eliminated by using a computer which combined all the communications, control, database and data entry functions with a multitasking operating systems and appropriate communications controllers and peripherals.

1. Data Entry and Editing

A multi-user database management system is employed in the file services (b) of the UCS, to support the data entry and editing functions (a1 through a6) on full-screen terminals. Some or all of these data entry and editing functions may reside on traffic control computer 24.

The insertion control unit definitions database (a1) includes, for each insertion control unit: the unique insertion control unit hardware address and release level, group membership codes, receiving site description and location, host computer protocol type, modem phone number, receiving site storage bank descriptor codes, and routing switcher descriptor codes. Database (a1) will also include store section or aisle codes, and any other codes associated with routing of programs within a particular receiving site.

The group control definitions database (a2) defines the members of control groups such as retail store chains, geographic regions, and the like. Insertion control units can be grouped by any information fields contained in the insertion control unit definitions database. Some of these groupings can be transmitted to the insertion control units for permanent storage as part of the control profile of the unit (as described below); other groupings can be set up ad hoc, and are individually transmitted to the insertion control unit with the control data embedded in the video signal.

The video program schedule (a3) describes the individual video programs or segments on all the video channels flowing through the uplink (j): event name, event serial number, channel number, start date and time and stop date and time.

The group control schedule database (a4) defines the control commands for the insertion control units within a particular group: switching commands according to events in the video program schedule, and recording, cuing and playing of video program segments in the receiving site's video storage bank. The group control schedule data includes a group identification code, or address control event type and timestamp.

The insertion control unit control schedule (a5) is the individual unit case of the group control schedule, and, in some embodiments, these two data entry and editing functions could be combined into a single database.

The host update definitions database (a6) defines the data flowing from the UCS to the receiving site host computers. It may be entered at an editing station, and kept in a text file; or it may be received from the host computer communications server (d), in which case it is classified on the date entry and editing stations. The update data are scheduled for specific insertion control units at specific timestamps or time ranges. the protocol employed by the receiving site host computer is classified and verified by comparing with the insertion control unit definitions database (a1).

2. Host Update Communications

The organizations being served by the distribution network may have one or more centralized computers not necessarily located at the receiving site. Therefore, a host communications service (d) is provided to receive updates from an organization's centralized computer for distribution to the host computers for each insertion control unit in the organization. In this way, an update transmitted from the organization's centralized computer to UCS 4 may be assured of delivery to many locations, via the same datalink delivering the video programming material.

One or more protocol support suites may therefore be provided in the host update communications server (d) for communication with host or centralized organizational computers. Data received from these computers is stored in the file server (b) and classified for distribution through the host update definitions editing station(s) (a6).

3. Insertion Control Unit Communications

As the insertion control units 56 perform their function, they collect verification logs and failure/alarm information with respect to the commands and other control data received. When certain kinds of failure occur, it is desirable to have the insertion control unit 56 dial the UCS and transmit descriptions of those failures for corrective actions and analysis. Also, the advertisers and other providers of video for the UCS commonly want to have the statistical verification that their video was received and delivered to the organizations being served.

Therefore, an insertion control unit communications server (c) is provided in the UCS in order to receive the verification logs and failure/alarm data. Usually, the insertion control unit communications server (c) resides in the verification data processing computer 48. The insertion control unit communications server handles multiple telephone modems 50, and transmits the data and logs of communications with the insertion control units on the UCS file server (b). It also uses the insertion control unit definitions database (a1) to verify proper usage of its facilities to prevent illegal access.

4. File Services and Print Services

The UCS must have file services (b) capable of storage and keyed retrieval and reporting (k and 1) for all the databases defined and edited (a1 through a6), or received from remote insertion control units (c) and organizational host computers (d). The UCS therefore provides standard multi-user access facilities and controls.

The databases (a1–a6) maintained in the file server of the UCS are constantly accessed by the Uplink Control System Server (e), in order to determine the schedule and dataflow through the encoders (f).

The first software embodiment of file server (b) is a fourth generation database package such as Oracle, Paradox, RMS, IMS, or the like. The actual choice is limited by the chosen hardware and operating system supporting the file server.

All such packages have built-in report generators capable of delivering formatted reports to the file server (k) and attached printer (l).

5. Uplink Control System Server

All control data and messages bound for the receiving site insertion control units must flow from the file server (b) through the uplink control system server (e) to the encoders (f) in order to be combined with the uplink video signal, composed of received video signals and/or video programming stored on videotape and/or disk (g, h, and i).

Stored programming must be cued, played, and switched according to the video program schedule developed and maintained in program schedule database (a3) through traffic control computer 24.

Figures 7A, 7B:
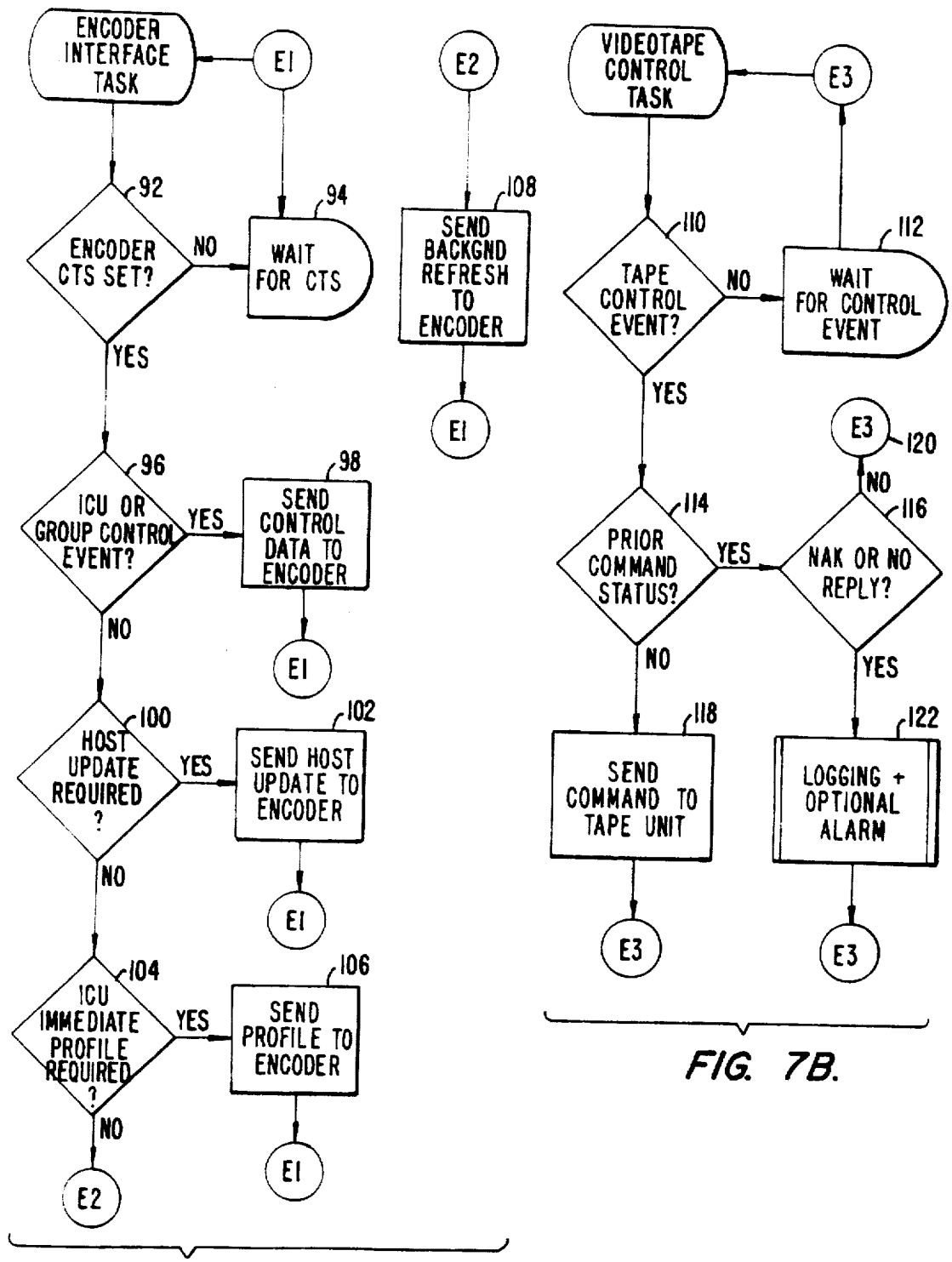
FIGS. 7A–7B are software flow diagrams of the software running the uplink control system of FIG. 2.

Referring now to FIGS. 7A–7B, it will be seen that the uplink control system server (e) is driven by the command, control and insertion control unit host data stored in the file server (b). It is delivered according to the video program and control event schedule prepared by traffic control computer 24.

The UCS server (e) has two principal tasks: an encoder interface task and a videotape (and/or videodisk) control task.

a. Encoder Interface Task

The video data encoder (f) is responsible for delivering a datastream to the video processing units (i) which can be combined with a video signal, and therefore must control the input rate allowed from the UCS server (e). In a first embodiment, hardware flow control is used to accomplish this purpose, such as Request To Send/Clear to Send (RTS/CTS) logic.

As illustrated in FIG. 7A, the encoder interface task (E1) continually checks the communication line with the encoder (92) and waits until the encoder sends a high CTS signal (94). When the encoder sends a high CTS signal, the encoder interface task (E1) of the UCS server (e) is allowed to send data to the encoder (f) (98, 102, 106). Otherwise, the encoder interface task (E1) must wait to transmit.

During idle and non-idle periods, the interface task (E1) continuously checks the various databases of definitions and schedules in order to build a minimum of four prioritized queues of insertion control unit data messages. Therefore, when a high CTS signal is received, the interface task chooses messages from the various queues by queue priority, and, within a particular queue, according to scheduled delivery time.

The highest priority queue is the insertion control unit and group control event queue (96). These are the commands and other control data associated with video channel switching and stored video source control in the receiving site.

The next highest priority queue is host computer data updates (100), such as product price changes received from an editing station (a6) or the host update communications server (d).

The next highest priority queue is the insertion control unit initial control profile download (104), typically required at the time an insertion control unit is installed. The control profile is a set of codes and commands stored in the insertion control unit. When a particular code is read from the control data in the video signal, it triggers a set of commands to be recalled from the control profile. This eliminates the need to send all such commands with the video signal. A request for a control profile download is input through the insertion control unit definitions editing station (a5).

The lowest priority queue is a background refresh of control profiles of all downlink insertion control units (108).

Periodically, the control profiles in the insertion control units may require updating, due to corruption from hardware faults, power fluctuations or the like. By providing a periodic refresh of control profiles, a continuous quality assurance check can be performed to validate and correct the control profile.

b. Videotape Control Task

The video program schedule entered and edited through video program traffic control computer 24 and stored in video program schedule database (a3) determines a set of video source control operations for handling video source material destined for the uplink. These operations include cuing, start/stop, rewind, and video switching into target channels of the multi-channel output of the video playback device 32 of the UCS. It will be understood that the particular type of medium used for video storage is not critical, and that a similar routine will be used for control of VCRs, optical disk players, or other video playback devices.

As shown in FIG. 7B, the Videotape Control Task (E3) continuously checks the video program schedule for events which require video playback control commands (110), and produces a time-ordered command message queue as a result.

When the videotape control task (E3) identifies a tape control event, the appropriate command is issued to the video playback devices 32 (118), which will send an acknowledgement back to the videotape control task (E3). For each command issued, a verification process is initiated. While checking the schedule for additional commands, the status of each prior command is evaluated (114) as acknowledgements come in from the video playback device which received the command.

When a prior command receives a negative acknowledgement or no reply, for operations which can be restarted, the videotape control task repeats the command (120). In addition, backup playback devices may be designated for automatic use when they are already on-line with duplicate source material. In the event of an unrestartable command with no backup playback device on-line, an alarm is issued for an operator to take corrective action and/or replace the failing playback device (122).

A first embodiment of the video playback device subsystem includes redundant drives with automatic backup switching. Whenever possible, videodisks are used instead of videotape, since they usually yield a much higher mean time between failure. A first embodiment of the Videotape Control Task (E3) supports videotape and videodisk control protocols which can be assigned independently to each of the task's Input/Output paths.

B. Insertion Control Unit Logic

The software of the Insertion Control Unit 56 of each receiving site will now be described with reference to FIGS. 8A–8F.

The Insertion Control Unit functionality is governed by the control data messages received with the video signal. Monitoring of these messages is performed by the Data Receiver Message Task (T1). Execution of tape (or other storage device) commands is controlled by the VideoTape Control Task (T10). Data to be communicated back to the UCS 4 is controlled by the Modem Control Task (T6). Any updates for a receiving site's host computer 70 are controlled by the Host DataComm Task (8).

1. Data Receiver Message Task

Figure 8A:
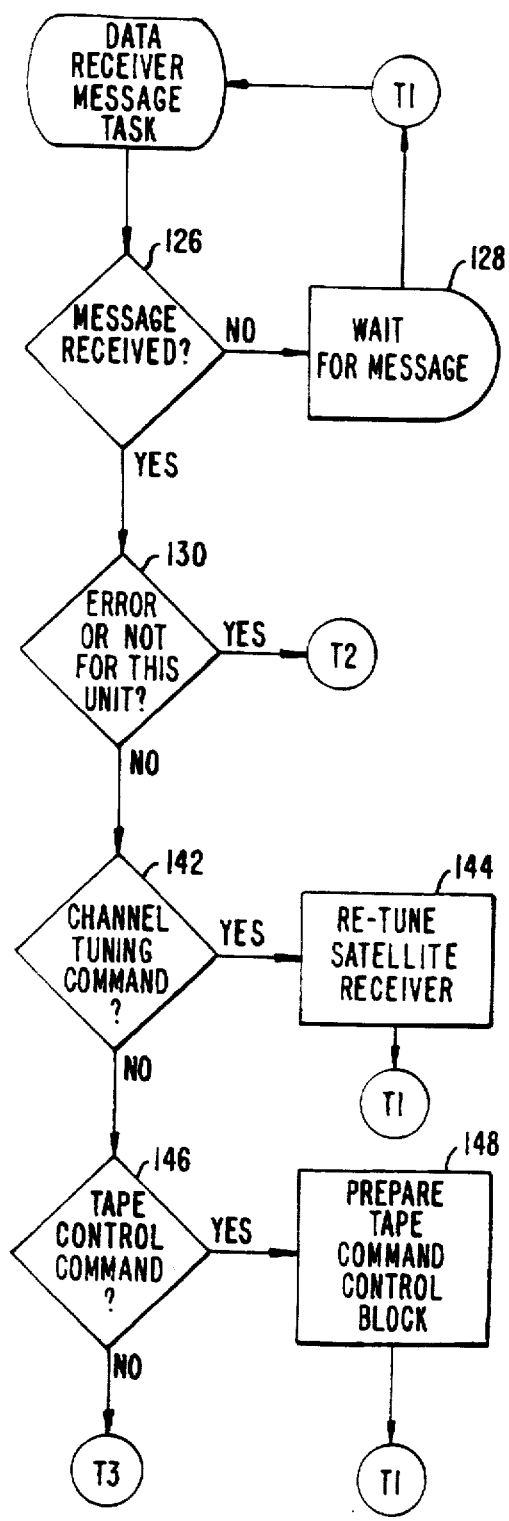
FIGS. 8A–8F are software flow diagrams of the software running the insertion control unit of FIG. 5.

Referring to FIGS. 8A–8E the Data Receiver Message Task (T1) has a main loop driven by the receipt of messages from receiver 54. As illustrated in FIG. 8A, the task continually waits and checks for the receipt of incoming messages (126, 128). A variety of well-known methods can be employed to detect completion of message transmission: In synchronous receivers, messages are identified with sync characters and the hardware automatically generates triggers at the end of reception of CRC data, which can be connected to an interrupt control line of the processor. In asynchronous messages, message completion can be determined by lengths associated with message op-codes, or by embedded length bytes in the message, or by time intervals of agreed-upon length following receipt of data.

Address recognition techniques are also-commonly employed in synchronous transmission so that the processor can ignore data received from other locations via the satellite communications link. If asynchronous transmission is used, the processor is actively involved in the receipt of all data bytes and determines whether to continue processing or discard the message.

Figure 8B:
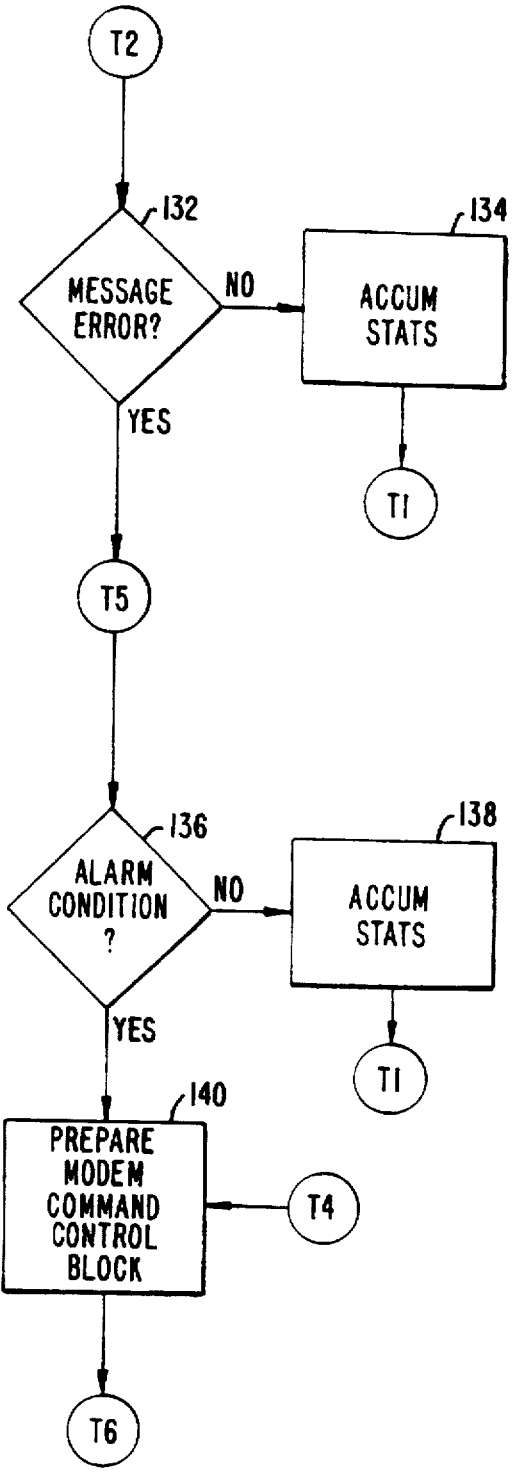

Messages received which are intended for other insertion control units are identified (130) and, in task T2, counted for statistical purposes (134) (see FIG. 8B). Messages received with CRC errors or other data format and protocol errors are, in a first embodiment, counted in order to provide reliability statistics for modem transmission to the Uplink Control System 4 (138).

If a sufficiently large percentage of messages are received in error, a first embodiment of the Data Receiver Message Task generates an alarm condition (136), prepares a modem command control block (140) and alerts the Modem Control Task (T6) that it must prepare and forward the alarm message.

Valid messages for the insertion control unit 56 include but are not limited to: video channel switching/tuning commands; tape (or other storage device) control commands; modem control commands; host data messages; and insertion control unit profile updates or refreshes.

When a switching/tuning command is received (142), the insertion control unit processor communicates the new channel to the receiver 54 (144).

When a tape control command is received (146), a tape command control block is prepared for processing in the VideoTape Control Task T10 (148).

Figures 8C, 8D:
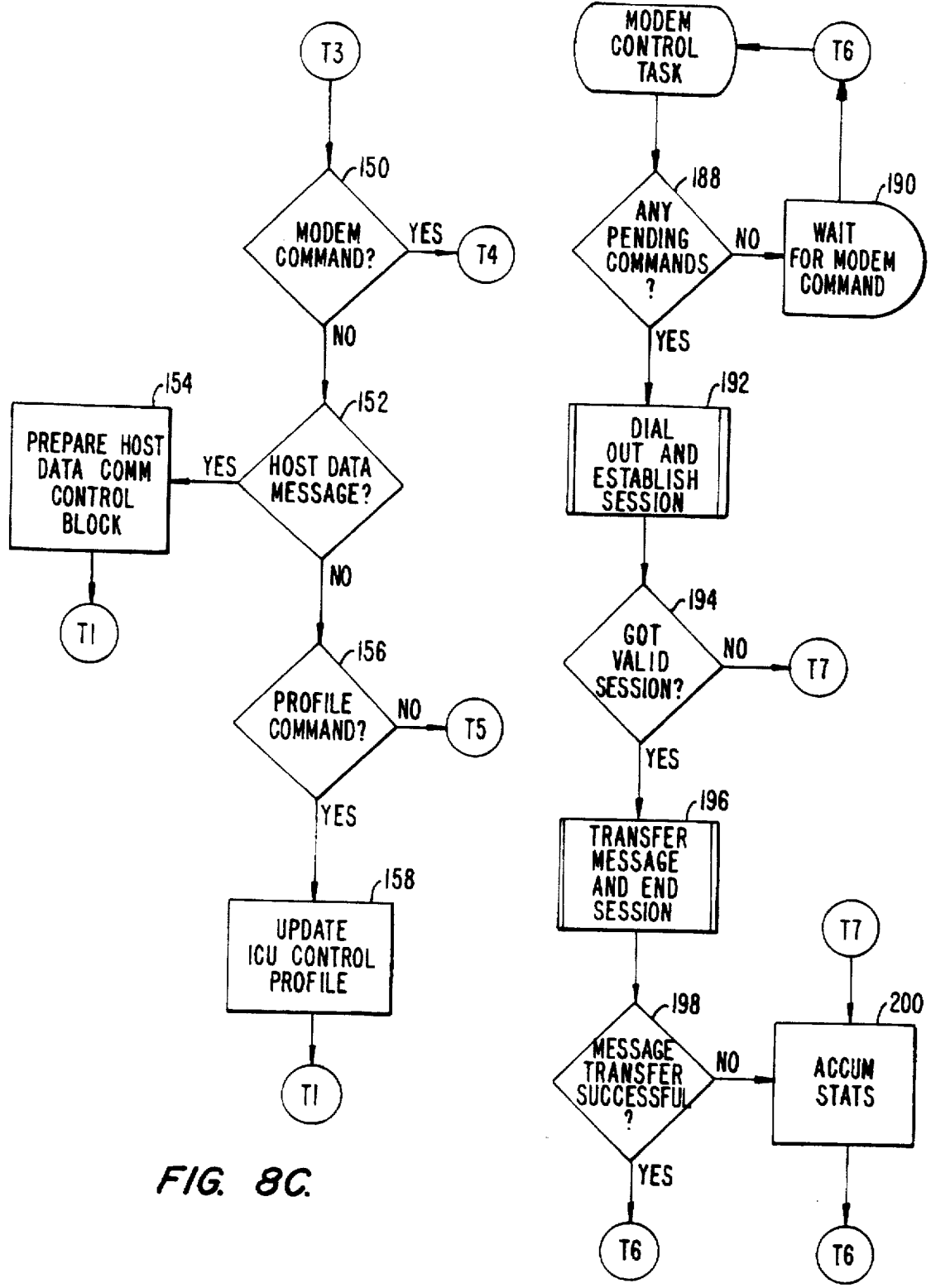

As shown in FIG. 8C, when a modem command is received (150), a modem command control block is prepared for processing by the Modem Control Task T6 (140).

When a host data message is received (152), a host datacomm control block is prepared for processing by the Host DataComm Task T8 (154).

When an insertion control unit profile update command is received (156), the command profile stored in memory units 64, 66 is updated (158).

The commands and other control data received may further require the updating of statistics and event log information contained in memory unit, for future reporting and verification of events to the Uplink Control System 4.

After proper routing and control block preparation, the data receiver message task resumes its primary loop, waiting for another message to be received (128).

2. VideoTape Control Task

In a first embodiment, the Videotape Control Task (T10) is driven by control blocks prepared by the Data Receiver Message Task (T1). The control blocks specify start record, stop record, cuing up, start play, and stop play operations for the video storage bank 72. Since receiver 54 must be switched to the local tape or other video storage device for playback of locally stored video segments, the videotape control task also controls the function of routing switcher 74. It will be understood, of course, that optical disks or other video storage media could be used in conjunction with or as an alternative to videotape.

Figures 8E, 8F:
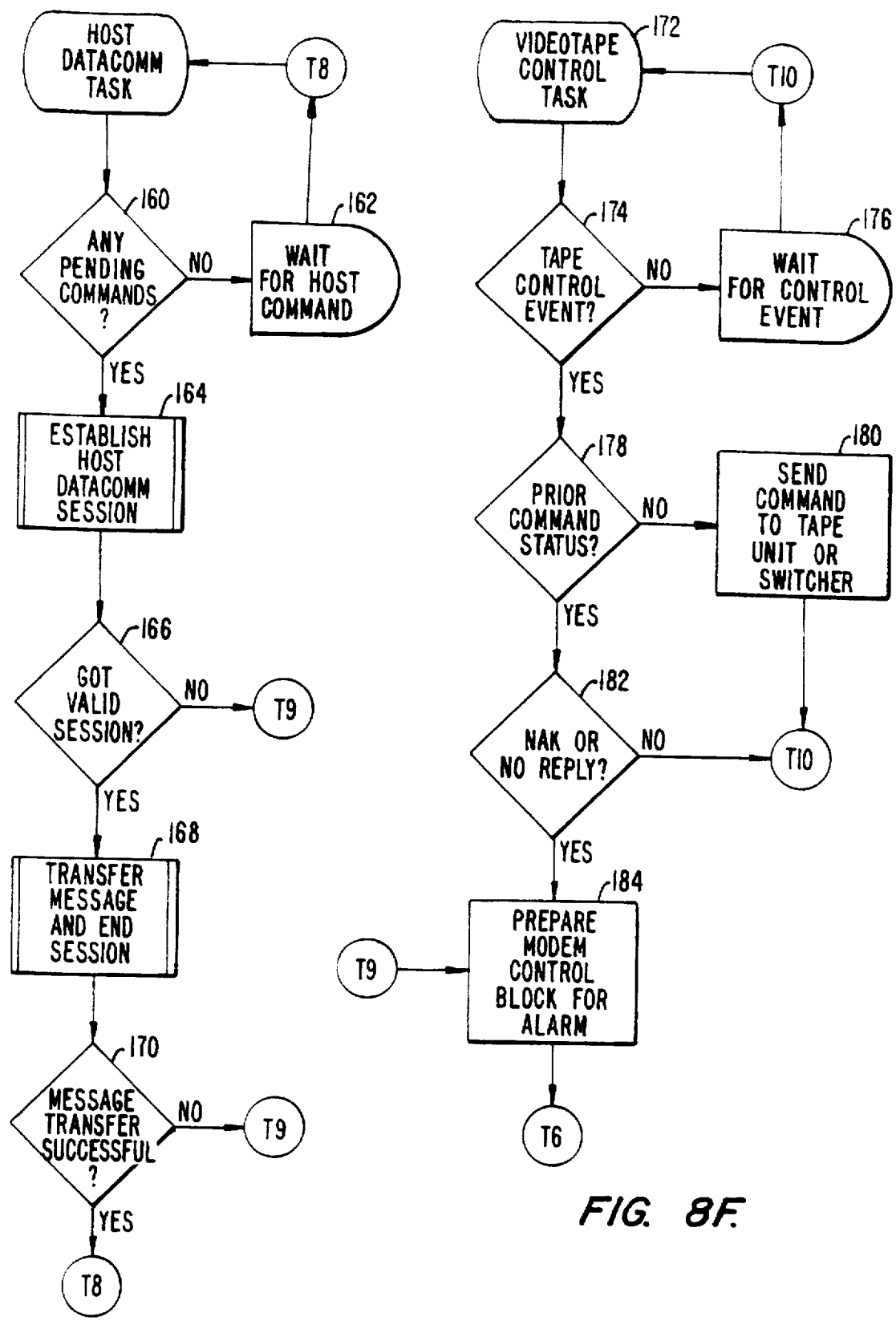

Referring to FIG. 8F, the videotape control task T10 waits until a tape control event message is received from the data receiver message task T1 (174, 176). The task then checks the status of prior commands sent to the storage bank 72, and, if all prior commands have been acknowledged (178), sends the tape control command to storage bank 72 or to routing switcher 74 (180).

Just as in the Uplink Control System, the VideoTape Control Task in the insertion control unit checks for proper completion of prior commands issued to the video storage hardware, and, in the event of errors (182), prepares a modem control block (T9) to generate an alarm message to be forwarded by the Modem Control Task T6 to the UCS 4 (184).

3. Host DataComm Task

In a first embodiment, the Host DataComm Task (T8) is driven by control blocks prepared by the Data Receiver Message Task (T1) specifying the messages or packets of data to send to an organization's central computer or local host, or to a protocol interface device. As shown in FIG. 8E, the host datacomm task (T8) waits for host command from the data receiver message task (T1) (160, 162). When a command is received, the task establishes communication with the host computer 70 (164). The data message is then transferred to the host 70 (168).

The host datacomm task (T8) employs one of a selected list of standard message and file transfer protocols, which are defined in the insertion control unit control profile. Failure to establish a communications session (166) or failure to transmit messages (170) results in the preparation of a modem control block (T9) to generate an alarm message to be forwarded by the Modem Control Task (T6) to the UCS 4.

4. Modem Control Task

In the first embodiment, the Modem Control Task (T6) is driven by control blocks prepared by the Data Receiver Message Task (T1), the VideoTape Control Task (T10), and the Host Datacomm Task (T8). These control blocks call for the transmission, by dialout and telecommunications to the UCS 4, of control data verification data and statistics, as well as alarm messages resulting from malfunctions which require that maintenance be performed on the insertion control unit 56 or its attached peripherals, such as the video storage devices in storage bank 72.

As illustrated in FIG. 8D, the task (T6) waits to receive a modem command from the data receiver message task (T1) (188, 190). When a modem command is received, the task dials out and establishes communication with the UCS 4 through modem 50 (192). When a valid communication session has been obtained, the task transfers the message through the modem 50 and ends the session (196).

During actions taken in response to a request represented in a control block, failure to establish communication (194) or transmit data (198) causes the modem control task to mark and retain the corresponding control block (200) so that retry attempts may be initiated after a delay time specified in the insertion control unit control profile. And, in the event of such failure, appropriate statistics are updated (200) for later transmission or for local readout to a maintenance technician.

Upon completion of the requested transmission, the modem control task (T6) returns to its primary loop waiting for another control block to be defined by one of the associated tasks.

SECOND EMBODIMENT

In order to avoid repetition, only the material differences between the first embodiment and the second embodiment will be described in this section. The main differences include the additions of (1) an information trafficking system, (2) a distributed audio system, (3) a live interrupt feature and (4) a receiver which contains insertion control unit 56.

A. Trafficking System

In the second embodiment of the invention, a trafficking system is located in UCS 4. This intelligent system schedules and sequences commercials and other programming segments comprised of digitized videos which are played in the retail stores. The traffic system determines what is displayed at the retail stores and when it is displayed, and it also traffics commercial placement in the various levels within retail organizations. Each retail organization, referred to as a chain, can be broken down into geographic areas called divisions. These divisions are then broken down into subdivisions (smaller geographic areas) and then stores (the lowest level of the organization) which display the customized programs. For example, Kroger is a supermarket chain that breaks down into divisions such as East, Central, Midwest and West. A further breakdown of the divisions represents subdivisions, such as a particular group of states within the Eastern division. The lowest breakdown of the organization is the grouping of stores within-the subdivisions, such as all stores in Salt Lake City. Each organization has its own unique breakdown free of fixed numbers associated with the breakdown structure.

Playlists contain the instructions for the list of segments that are to be played at each of the retail stores. A playlist is created for each store on a periodic basis (e.g., daily). If the playlist is unique to even the lower levels of the retail organizations, then a voluminous number of playlist combinations are developed. Thus, playlist creation and distribution could number from the tens to thousands.

Host computer 70 in decoding and switching system 12 connects receiver 54 to a magnetic drive which contains the "store forward" hardware. The store forward hardware holds the available program segments which are required by the playlist for displaying. In the second embodiment, the store forward hardware in receiver 54 holds 80 minutes of segmented program. Changes in the playlist after it has been delivered to the stores is possible because the traffic system makes sure desired new segments are accessible from the store forward device before the insertion or deletion is made and the applicable updates to the playlist are uplinked to the stores.

A traffic system such as a Jefferson-Pilot Data Services, Inc. (JDS2000) traffic system, modified to have 12000 discrete channels rather than 5 discrete channels, serves as the trafficking system for this invention. The traffic system provides the front end functions and host computer 70, as a secondary system, retrieves and completes the functional requirements of the trafficking system. Host computer 70 has knowledge of the materials required (the spots, vignettes, programs, video coupons, and any other digitized video that can be referenced), the distribution of these materials, and the status of the playlist. In addition, host computer 70 gathers and consolidates run/no-run information from each of the stores and sends this information to the traffic system such that the traffic system can generate the advertiser's bills. Host computer 70 provides these required features.

The traffic system manages commercial inventory (including notification of material inventory and generation of a partial playlist), store division and store specific advertising requirements, the booking and trafficking of orders, satellite requirements, and invoicing and accounts receivable information. In order to provide all these features, the traffic system monitors the distribution of segments, both network and local, to all stores. The playlist is very dependent on the stores having the correct materials to broadcast. The traffic system has a media management system which helps users maintain and manage the physical media that are to be displayed, but an additional inventory/distribution system is also used to monitor which of the stores receive segment updates. The traffic system produces a dub list from its media management system to notify the system of new segments that are received. This dub list allows the traffic system to maintain an accurate material inventory.

A "wheel" concept is used to handle the high volume of commercials and other programs which are displayed in the stores. A wheel is a cycle of time that represents the format of what will be shown on the displays at the stores. For example, if the wheel cycle is three hours, then every three hours the display would repeat itself. The traffic system provides the cycling needed for this wheel concept. Multiple wheels per day allow the traffic system to establish a playlist for the entire day. The wheel format simplifies the contract, invoicing and billing required because these can be initially based on the original wheel(s) and later changed based on the actual number of plays. Rates may be set and sold by the wheels. Moreover, contracts may be entered into the traffic system to cover the base programming (the original wheels).

The traffic system can be remotely accessed by people not at the distribution center DC. For example, scheduling possibilities can be checked by salespeople in the field. This allows salespeople to report scheduling opportunities to an advertiser while at the advertiser's place of business. Moreover salespeople in the field can enter the contracts for advertisers remotely. With the information described, the traffic system can produce contracts, sales projections, and other sales and revenue analysis reports.

B. Distributed Audio System

The audio system controller in one embodiment adjusts the level of the audio in up to four zones in each retail store in response to varying noise levels in each zone. The desired audio level is unobtrusive and yet still intelligible. Distributed remotely, the system utilizes loudspeakers and noise monitoring microphones which may be, but are not necessarily located on the display televisions. Strategically placed noise detectors are used for determining the current volume levels because the acoustical environment in a retail store is far from homogeneous. The audio system measures the noise levels with these noise detectors and adjusts the volume of the audio based on this received information or the signal to noise ratio.

The distributed audio system uses a multi-zone control scheme which divides each store into four zones for more effective distribution of the audio part of the display. The speakers in this system are placed in a herringbone location pattern in order to cover a large area in the retail store with the fewest number of speakers.

Figure 9:
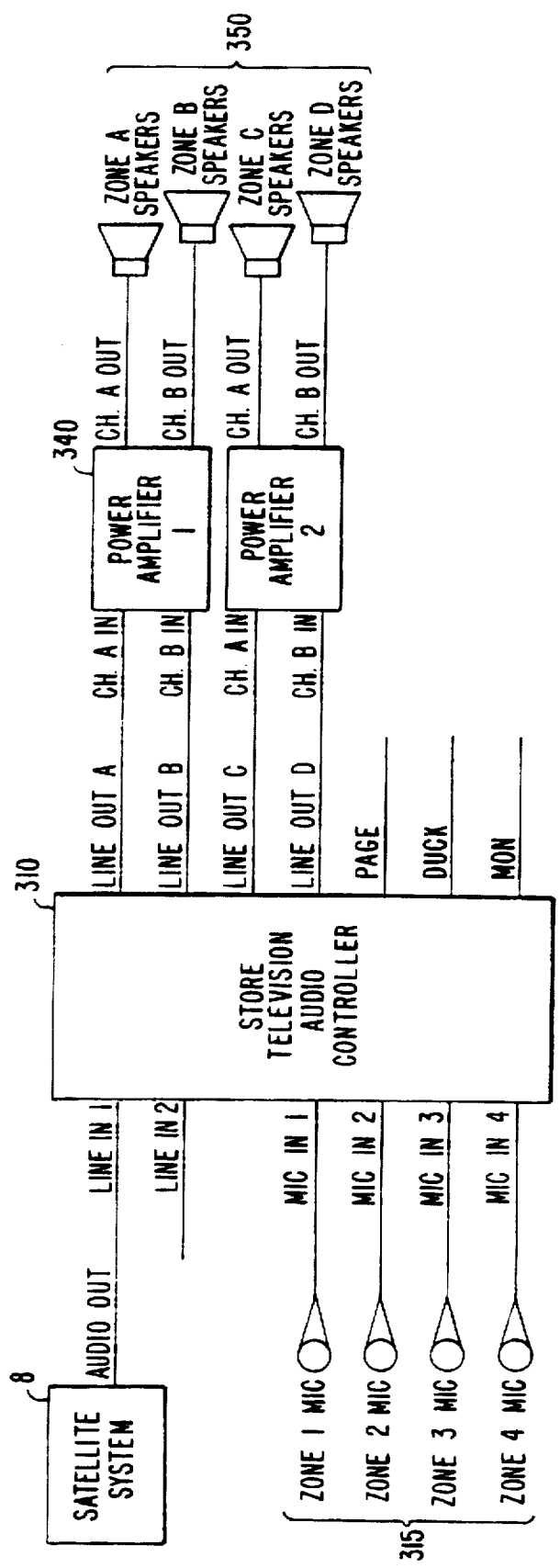
FIG. 9 is a block diagram of the distributed audio system.

FIG. 9 is a block diagram of distributed audio system 305. Audio system 305 includes satellite system 8, audio controller 310, zone microphones 320, power amplifiers 340 and zone speakers 350. The audio output from the signal sent through satellite system 8 is sent into audio controller 310. Audio controller 310 monitors the sound level in various areas with zone microphones 315 connected to audio controller 310 at its microphone inputs. The audio controller takes the information from both the audio input and microphone inputs and generates audio signals which are sent to audio power amplifiers 340. Amplifiers 340 amplify the received signals and then sends them to zone speakers 350.

Zone microphones 315 are, for example, Crown PXM11 sold commercially by Crown International Incorporated and power amplifiers 340 are, for example, Crown CT200 also sold commercially by Crown International Incorporated. Zone speakers 350 are speakers made up of two loudspeakers sitting back to back. These loudspeakers are positioned with their faces at 70 degree angles such that their sound is directed toward the area where an average height person would be walking in the retail store.

Figure 10:
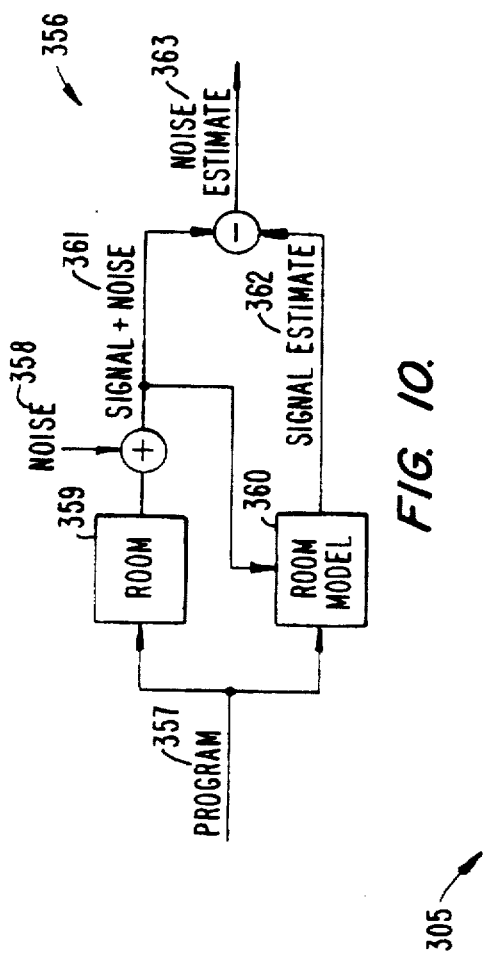
FIG. 10 is a process flowchart for the control processor in the audio controller.

FIG. 10 is a process flow chart for control processor 356 in audio controller 310. Audio controller 310, using single control processor 356. The device samples the area noise and adjusts the sound level in the four zones, described above, in a round-robin fashion. Control processor 356 receives the display's audio at program source 357. Reverberated program and noise 358 is distinguished from noise generated by other sources in room 359. This is accomplished by constructing room model 360 based on a comparison of program 357 and microphone signals 361. Room model 360 produces estimate of signal power 362 which is the signal power the microphones would detect if room 359 was absent of noise 358. Signal estimate 362 is compared with combination of signal and noise 361 detected by the microphones to produce noise estimate 363 and the signal to noise ratio (in decibels).

Figure 11:
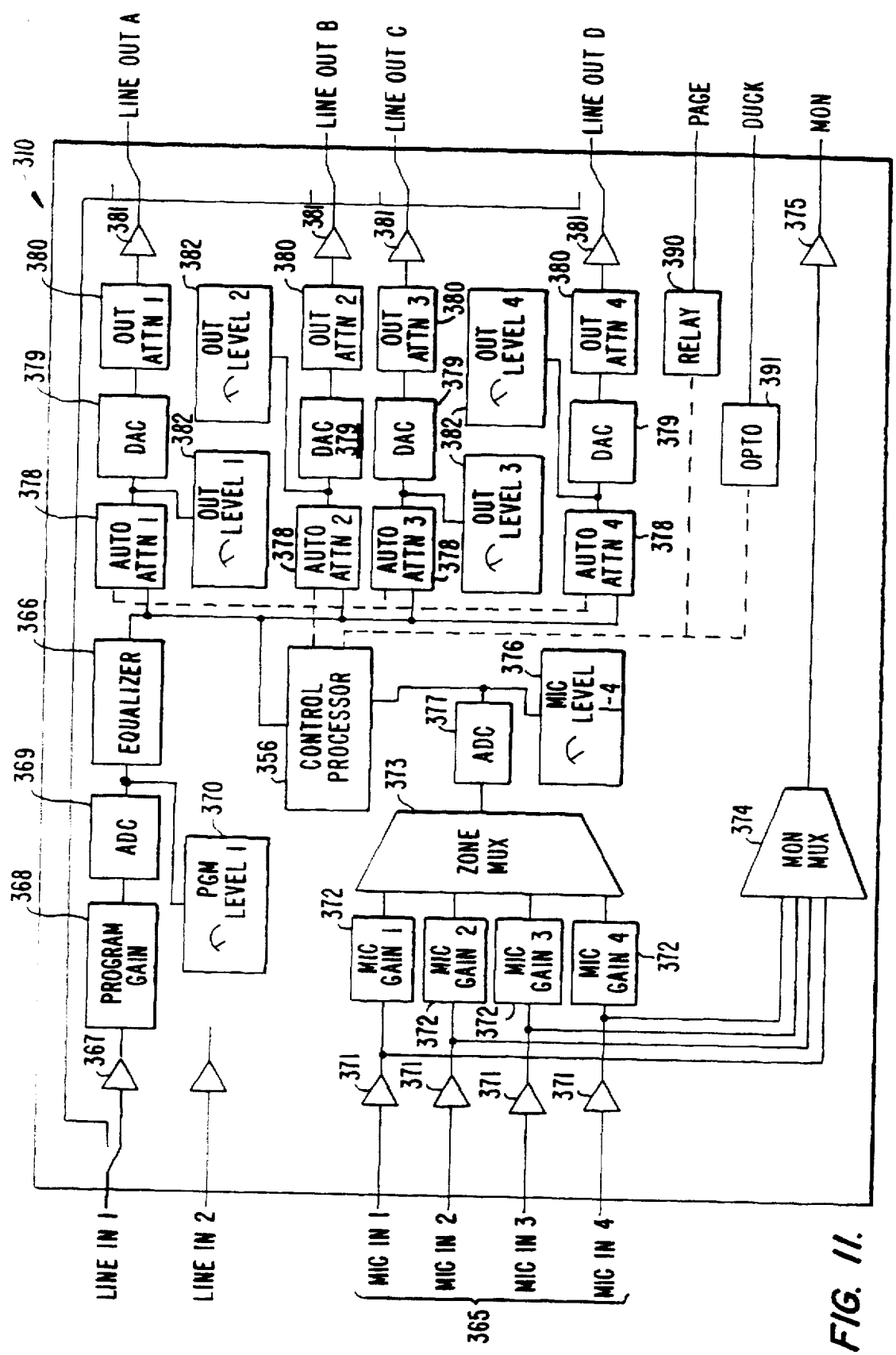
FIG. 11 is a block diagram of the audio controller in the distributed audio system.

FIG. 11 is a block diagram of audio controller 310 in distributed audio system 305. The audio output from the signal sent through satellite system 8 is input to audio controller 310 and sent through buffer 367 to amplifier 368 which amplifies the incoming signal to match the range of analog to digital converter ("ADC") 369. After passing through ADC 369, the signal is monitored by meter 370 and sent through equalizer 366 to control processor 356. Equalizer 366 is a cascade of digital filters. Control processor 356 monitors the sound in the room via microphones 365. The signal from microphones 365 is sent through buffers 371 to multiplexer 374 and to amplifiers 372. Multiplexer 374 sends one signal at a time through buffer 375 to an output allowing for monitoring of the signals from microphones 365. Amplifiers 372 amplify the incoming signals to match the range of ADC 377 and then sends these amplified signals to multiplexer 373 which allows only one microphone signal to enter ADC 377 at a time. The signal output by ADC 377 is monitored by meter 376 and is sent to control processor 356.

The signal output by the control processor 356 is sent to the automatic attenuators 378 which attenuate the signal based on information received from control processor 356. Attenuators 378 output to monitors 382 and to DACs 379. The signals are then sent to output attenuators 380 which attenuate the signals such that they match the subsequent equipment. The output from attenuators 380 is sent through buffers 381 and then output from audio controller 310. Control processor 356 also has an interactive paging system. Signals received through opto-isolator 391 inform control processor 356 that a page is going to occur throughout the store. Based on this information, control processor 356 causes the sound from audio system 305 to be turned down during the page. Control processor 356 outputs, in order to interface with the paging system, through relay 390.

C. Live Interrupt

A real time updating feature, located in UCS 4 in the second embodiment, allows an interrupt signal to override the original playlist. The live interrupt is important because it allows the video distribution network to be much more interactive. The interrupt signal is digitally sent from UCS 4 to satellite 8 which distributes the "live" material to the store forward hardware located in receiving sites. Once received, the live material is directly sent to the decoder and played.

A base address for each receiving device is included in the interrupt signal such that certain desirable stores can be targeted for receiving and playing the interrupt signal. For example, a real time interrupt with a weather forecast would only be played at the stores located in the geographic region with that particular weather forecast.

In order to facilitate the live interrupt feature, the traffic system allows an additional partial playlist to be generated after the original playlist has been finalized and has begun to be displayed. Receiver 54, described in greater detail below, is designed to allow preemptive video to be added at a certain time in an override fashion, and it also handles the redistribution of the playlist.

Because of the logistics with the transmission of material to all of the retail stores, when live events to be replayed at a later time are sent to the stores, these live events will be sent directly to the display monitors for displaying as they are being written to a hard segment in the disk drive in receiver 54. The store forward disk has asynchronous read/write capability, so this procedure eliminates the contention on the store forward disk of writing new material while the store forward device is accessing its disk drive for material. The switching of the feed at receiver 54 from the store forward device to the satellite feed will be handled by receiver 54 described below.

D. The Receiver

In the second embodiment, receiver 54 contains insertion control unit 56 in decoding and switching system 12. Receiver 54 receives the playlist from the trafficking system via satellite 8 and interprets the playlist in order to drive the segments that are to be displayed on the monitors in the retail stores. The segments are sent through satellite 8 in a serial stream, so no frequency change is necessary. Multiple regional campaigns are placed within the network-wide signal sent to satellite 8 and these regional campaigns are saved by their corresponding regional receivers in the retail stores. A header is placed on each segment so that regional receiver 54 only saves the part of the signal carrying the segments needed in its region. Receiver 54 also receives periodic updates in this manner. In the second embodiment, these updates are sent nightly while most retail stores are closed. By only storing the needed regional information rather than the entire signal, the system runs more efficiently. The Media Master Integrated Receiver Decoder developed and sold commercially by GTE Spacenet Corporation is used, for example, in the second embodiment for receiver 54 in decoding and switching system 12. Receiver 54 utilizes advanced forms of digital compression. Host computer 70 connects receiver 54 to the magnetic drive which holds the receiving site's store forward set up. The files in store forward, which are updated each night, store the segments needed for the individualized program displayed in the store.

More specifically, receiver 54 receives an RF signal from satellite 8 and converts it to a digital bit stream called the comm data stream. The comm data stream contains digital frames of compressed audio, video and other digital data which receiver 54 converts. The user interacts with receiver 54 remotely through a series of text menus displayed on the user's television screen. Receiver 54 has many important features including: (1) capable of upgrading software via satellite transmission, (2) capable of operating at two data rates, 3.375 Mbps or 6.750 Mbps, (3) having a single channel per carrier or a dual channel per carrier format, (4) providing basic descrambling functions for the input data stream, (5) facilitating the connection of peripheral devices to an expansion port, (6) having a telephone interface via an internal modem, (7) having an interface for a security module to decrypt any secure data, (8) having an interface for a module which will allow an upgrade to an enhanced video decompression scheme, and (9) having a compatible video decompression and conversion scheme.

Figure 12:
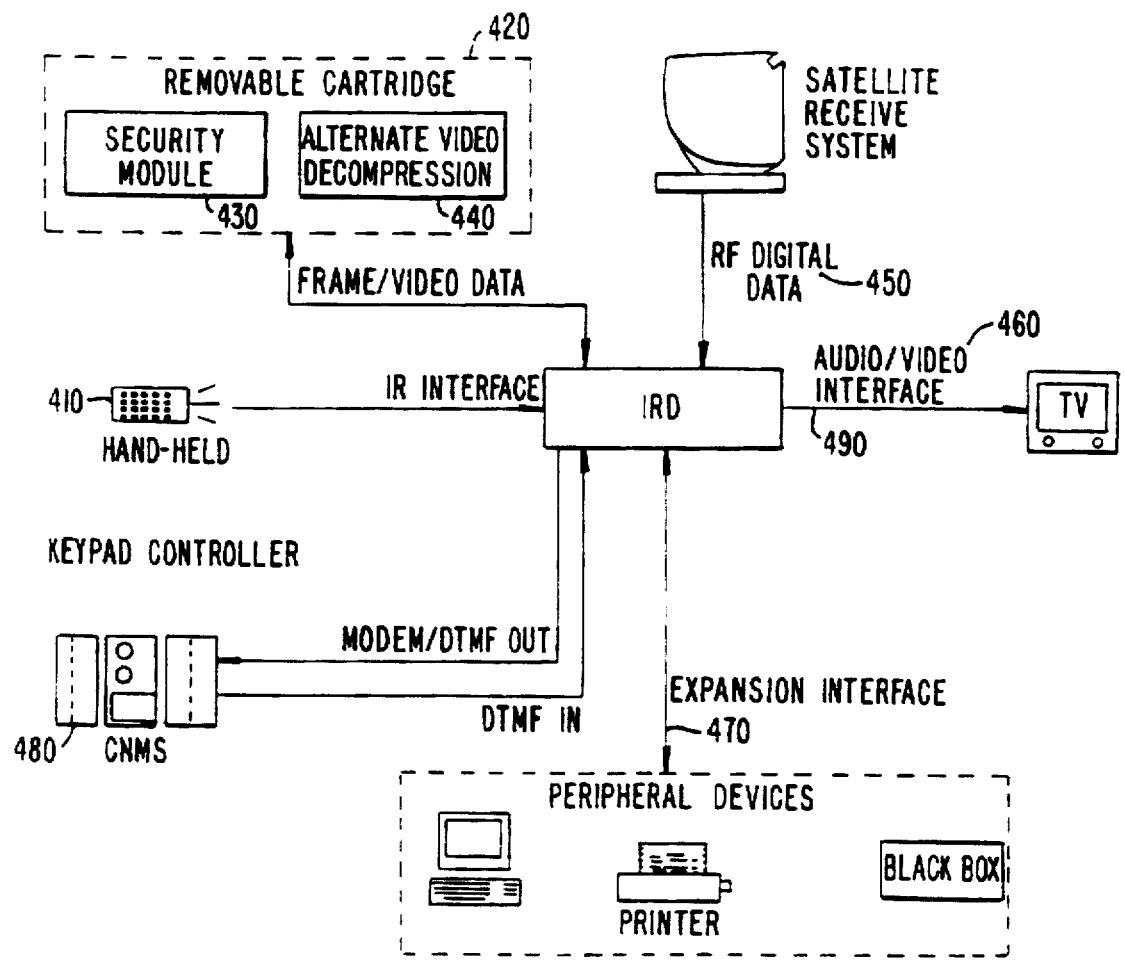
FIG. 12 is a block diagram showing the various subsystems and peripheral interfaces of a specific receiver system.

FIG. 12 is a block diagram showing the various subsystems and peripheral interfaces of specific receiver system 54. A device is considered a subsystem if it is included with receiver 54, while peripheral devices are separate from receiver 54. Beginning with the subsystems, infrared transmitter 410 is a hand-held keypad device (remote control) which emits an infrared signal. When one of the 22 different push buttons on infrared transmitter 410 is pressed, a unique Pulse-Width Modulated ("PWM") signal is generated. Receiver 54 receives, decodes and acts upon these infrared signals. The only user control access to receiver 54 is via the remote control. Use of the remote control is guided by a menu displayed on the user's television screen.

Removable cartridge 420 contains circuitry which will provide additional features when it is inserted in the removable cartridge port. Currently, receiver 54 will accommodate one cartridge containing a security module alone or containing a security module coupled with an alternate video decompression module. Security module 430, located within removable cartridge 420, is a logic circuit which connects receiver 54 motherboard through the removable cartridge port. It receives the comm frame data stream after it has been descrambled and error corrected. The security module then decrypts each frame received and outputs the decrypted frames back to receiver 54 motherboard. The security module can process data at rates up to 6.75 Mbps. Alternate video decompression module 440, also located within removable cartridge 420, allows the unit to be upgraded in the field when new and enhanced decompression schemes become available. This module is a logic circuit which connects to receiver 54 motherboard through the removable cartridge port. It receives the video data field from each frame, then decompresses the data and outputs a video signal.

Turning now to the peripheral interfaces, RF input 450 (1) receives a broadcast signal from the satellite receive system via the dual-pole KU band low noise block down converter ("LNB") and (2) outputs a DC voltage to select horizontal or vertical polarization of the LNB. RF input 450 is capable of receiving a 948 to 1452 MHz IF input from the satellite receiver's LNB, while providing a 11–23 V DC LNB operating voltage. The operating voltage level determines the polarization of the LNB, with 11 to 16 V for horizontal, and 18 to 23 V for vertical.

Television interface 460 contains connectors which provide the following video signals: (1) S-video ("SVHS") signal, (2) composite NTSC video/PAL video signal, (3) RF Modulated NTSC signals on channel 3 or 4 and (4) stereo audio signal. A loop-through circuit from the TV antenna in connector to the out to TV connector provides a means to pass additional NTSC channels through receiver 54 unit. A signal form any device such as a VCR or cable television hook-up can be routed through receiver 54 provided that the signal is in VHF/UHF range. The VHF channel ¾ modulator must be disabled to allow use of the loop-through. The user can disable it with the remote control unit or it can be disabled via-broadcast software.

Expansion port interface 470 is a set of signals accessible through a DB-44 connector on the back of receiver 54 box. This interface allows peripheral devices to be connected which will enhance the functionality of receiver 54. When a peripheral is connected, receiver 54 serves as the main receiving unit, separating incoming data from the broadcast signal and providing a data output to the appropriate peripheral.

Telephone output connector 480 provides data communications compatible with both Bell 212A/103 and CCITT V.22/V.21 standards. The interface also provides dual-tone multifrequency ("DTMF") receive and transmit capabilities. This feature can be used for connection to the central network management system ("CNMS") of the DTS.

Digital audio out interface 490 provides consumer format digital audio transmitted via a 75 ohm, unbalanced drive circuit. The interface meets EIAJ CP-340 and IEC 958 format.

Figure 13:
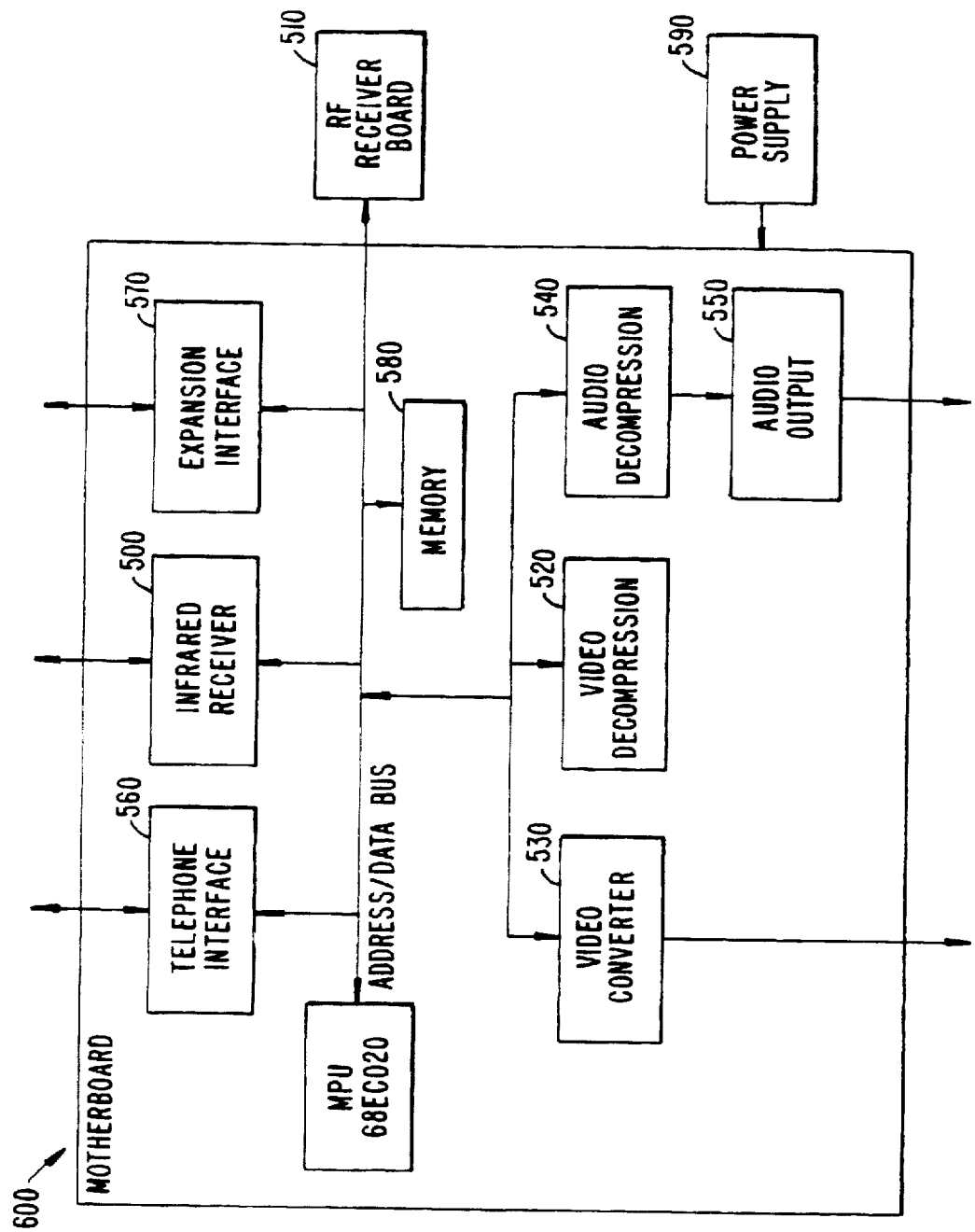
FIG. 13 is an electronic block diagram of a receiver system.

FIG. 13 is an electronic block diagram of receiver system 54. The major components of receiver 54 electronics include (1) infrared receiver 500, (2) RF receiver board 510, (3) video decompression circuit 520, (4) video conversion circuits 530, (5) audio decompression circuit 540, (6) audio output circuit 550, (7) telephone interface 560, (8) expansion interface 570, (9) memory 580 and (10) power supply 590.

While the above is a complete description of the invention, various alternatives, modifications, and equivalents may be used. For example, in some instances, non-satellite forms of distribution from the distribution center, such as cable transmission, may be appropriate. Further, the invention could be used for purposes other than advertising, such as providing educational programs in schools, or providing entertainment in restaurants, airports, and the like. Therefore, the above description should not be taken as limiting the scope of the invention which is defined by the appended claims.

What is claimed is:

1. A video media distribution network comprising:
    a central distribution center having means for transmitting a network-wide video program and market-specific segments to a plurality of receiving sites at places of business each having an associated address, said network-wide video program including regional-specific segments, said market-specific segments including a destination address and a set of control data encoded therein, wherein the receiving sites comprise:
    a receiver to receive said network-wide video program and said market-specific segment;
    a reader coupled to said receiver to read the destination addresses in said market-specific segments;
    a storage unit coupled to said receiver to store desired segments from said regional-specific segments and said market-specific segments;
    an insertion control unit coupled to said receiver to insert said market specific segments into said regional-specific segments according to commands contained in the control data to produce a customized program; and
    a display coupled to said receiver to display the customized program at said places of business.

2. The video media distribution network of claim 1 further comprising an interrupt for interrupting said customized program.

3. The video media distribution network of claim 1 further comprising a trafficking system.

4. The video media distribution network of claim 3, wherein said trafficking system determines the commands contained in said control data.

5. The video media distribution network of claim 3, wherein said trafficking system organizes said regional-specific and said market-specific segments within said customized program.

6. The video media distribution network of claim 3, wherein said trafficking system manages information in said network and generates bills from gathered and consolidated information.

7. The video media distribution network of claim 3, wherein said trafficking system utilizes a wheel concept.

8. The video media distribution network of claim 3, further comprising a data communications link, between said trafficking system and said distribution center, for transmitting information including reception verification, alarm messages, and statistical information.

9. The video media distribution network of claim 1, further comprising:
    an interrupt feature for interrupting said customized program;
    wherein said interrupt feature includes unanticipated segments transmitted from said distribution center, said unanticipated segments having destination addresses.

10. The video media distribution network of claim 9, wherein said unanticipated segments are directly decoded at said receiving sites.

11. The video media distribution network of claim 9, wherein:
    said reader is capable of reading said destination addresses in said unanticipated segments;
    said storage unit is capable of storing only desired segments from said unanticipated segments;
    said insertion control unit is capable of overriding said regional-specific segments and said market-specific segments with said unanticipated segments, when the destination address matches the associated address of the receiving site, according to commands contained in the control data to produce an altered program; and
    said display is capable of displaying said altered program.

12. The video media distribution network of claim 1, wherein the network-wide program and market specific segments are transmitted in digital signals.

13. The video media distribution network of claim 12, further comprising a digital compression device to compress the digital signals, said means for compressing being within said distribution center.

14. The video media distribution network of claim 1, wherein the network-wide program and market-specific segments are transmitted through a single transponder of the satellite.

15. The video media distribution network of claim 1, wherein the network-wide video program and the market-specific segments comprise full motion video program segments.

16. The video media distribution network of claim 1, wherein said receiving sites are divided into a plurality of sections each having a section associated address, said market-specific segments further having a section destination address readable by said reader, whereby section-customized programs for each of said sections are produced.

17. The video media distribution network of claim 1, further comprising a storage and playback unit to store said network-wide program and said market-specific segments for time-delayed playback, said storage and playback unit being coupled to said receiving sites.

18. The video media distribution network of claim 17, wherein said storage and playback unit is responsive to storage commands contained in said control data.

19. A method of broadcasting a plurality of customized video programs to a plurality of receiving sites each having an associated address, the method comprising:
    encoding each of a plurality of market-specific segments with a destination address;
    transmitting a network-wide program containing regional-specific segments, and the market-specific segments to the receiving sites;

receiving the network-wide program containing the regional-specific segments, and market-specific segments at each site;

reading the destination addresses in each market-specific segment;

storing at each particular receiving site the desired segments of said regional-specific segments and market-specific segments to said particular receiving sites; and inserting the market-specific segments into the regional-specific segments to produce a customized program, wherein each receiving site is a place of business.

20. The method of claim 19 further comprising interrupting said customized program at said receiving sites when unanticipated segments having a destination address matching the address at said receiving sites are transmitted from said distribution center.

21. The method of claim 20, wherein said unanticipated segments override said regional-specific segments and said market-specific segments to produce an altered program.

22. The method of claim 20 wherein the unanticipated segments are directly sent to a decoder at said receiving sites.

23. The method of claim 19 wherein said regional-specific segments and market-specific segments contain information; and further comprising trafficking said transmitting and said inserting of said information to produce a customized program, said trafficking manages said information and generates bills from gathering and consolidating said information, and said trafficking utilizes a wheel program sequence.

24. The method of claim 19 wherein the network-wide program and market-specific segments are transmitted via satellite.

25. The method of claim 19 wherein the network-wide program and market-specific segments are transmitted in digital signals.

26. The method of claim 19 wherein the receiving sites each have a plurality of sections having a section associated address, the method further comprising encoding a section destination address in the market-specific segments, reading the section destination address at the receiving site, and displaying in each of said sections the network-wide program having inserted therein the market-specific segments with a section destination address matching the section associated address.

27. A method of broadcasting a plurality of customized video programs to a plurality of receiving sites each having an associated address, the method comprising:

encoding each of a plurality of regional-specific segments with a destination address;

encoding each of a plurality of market-specific segments with a destination address;

transmitting a network-wide program containing said regional-specific segments, and said market-specific segments to said receiving sites;

receiving said network-wide program containing said regional-specific segments and market-specific segments at each of said receiving sites;

reading the destination addresses in each of said regional-specific segments and each of said market-specific segments;

storing at each said receiving site only said regional-specific segments having destination addresses matching addresses associated with said receiving sites; and inserting said market-specific segments having destination addresses which match addresses associated with said receiving sites in said network-wide program to produce a customized program, wherein said receiving sites are places of business.

28. The method of claim 27, further comprising displaying said customized program on at least one television set in each of said receiving sites.

29. A video media distribution network comprising:

a distribution center having means for transmitting a network-wide video program and market-specific segments to a plurality of receiving sites each having an associated address, said network-wide video program including regional-specific segments, said market-specific segments including a destination address and a set of control data encoded therein, wherein the receiving sites comprise:

a receiver to receive said network-wide video program and said market-specific segment;

a reader coupled to said receiver to read the destination addresses in said market-specific segments;

a storage unit coupled to said receiver to store desired segments from said regional-specific segments and said market-specific segments;

an insertion control unit coupled to said receiver to insert said market specific segments into said regional-specific segments according to commands contained in the control data to produce a customized program;

a display coupled to said receiver to display the customized program; and an interrupt feature coupled to said insertion control unit to interrupt said customized program.

30. The video media distribution network of claim 29, wherein said interrupt feature includes unanticipated segments transmitted from said distribution center, said unanticipated segments having destination addresses.

31. The video media distribution network of claim 30, wherein said unanticipated segments are directly decoded at said receiving sites.

32. The video media distribution network of claim 30, wherein:

said reader is coupled to said receiver to read said destination addresses in said unanticipated segments;

said storage unit is coupled to said receiver to store only desired segments from said unanticipated segments;

said insertion control unit is coupled to said receiver to override said regional-specific segments and said market-specific segments with said unanticipated segments, when the destination address matches the associated address of the receiving site, according to commands contained in the control data to produce an altered program; and said display is coupled to said receiver to display said altered program.

33. The video media distribution network of claim 29, wherein said receiving sites are divided into a plurality of sections each having a section associated address, said market-specific segments further having a section destination address readable by said means for reading, whereby section-customized programs for each of said sections are produced.

34. The video media distribution network of claim 29, further comprising:

a storage and playback unit for storing said network-wide program and said market-specific segments for time-delayed playback, said storage and playback unit being coupled to said receiving sites.

35. A video media distribution network comprising:
a distribution center having means for transmitting a network-wide video program and market-specific segments to a plurality of receiving sites each having an associated address, said network-wide video program including regional-specific segments, said market-specific segments including a destination address and a set of control data encoded therein, wherein the receiving sites comprise:
   a receiver to receive said network-wide video program and said market-specific segment;
   a reader coupled to said receiver to read the destination addresses in said market-specific segments;
   a storage unit coupled to said receiver to store desired segments from said regional-specific segments and said market-specific segments;
   an insertion control unit coupled to said receiver to insert said market specific segments into said regional-specific segments according to commands contained in the control data to produce a customized program;
   a display coupled to said receiver to display the customized program; and
   a trafficking system coupled to said insertion control unit.

36. The video media distribution network of claim 35, wherein said trafficking system determines the commands contained in said control data.

37. The video media distribution network of claim 35, wherein said trafficking system manages information in said network and generates bills from gathered and consolidated information.

38. The video media distribution network of claim 35, further comprising a data communications link, between said trafficking system and said distribution center, for transmitting information including reception verification, alarm messages, and statistical information.

39. A method of broadcasting a plurality of customized video programs to a plurality of receiving sites each having an associated address, the method comprising:
   encoding each of a plurality of market-specific segments with a destination address;
   transmitting a network-wide program containing regional-specific segments, and the market-specific segments to the receiving sites;
   receiving the network-wide program containing the regional-specific segments, and market-specific segments at each site;
   reading the destination addresses in each market-specific segment;
   storing at each particular receiving site the desired segments of said regional-specific segments and market-specific segments to said particular receiving sites;
   inserting the market-specific segments into the regional-specific segments to produce a customized program; and
   interrupting said customized program said receiving sites when unanticipated segments having a destination address matching the address at said receiving sites are transmitted from said distribution center.

40. The method of claim 39, wherein said unanticipated segments override said regional-specific segments and said market-specific segments to produce an altered program.

41. A method of broadcasting a plurality of customized video programs to a plurality of receiving sites each having an associated address, the method comprising:
   encoding each of a plurality of market-specific segments with a destination address;
   transmitting a network-wide program containing regional-specific segments, and the market-specific segments to the receiving sites;
   receiving the network-wide program containing the regional-specific segments, and market-specific segments at each site;
   reading the destination addresses in each market-specific segment;
   storing at each particular receiving site the desired segments of said regional-specific segments and market-specific segments to said particular receiving sites;
   inserting the market-specific segments into the regional-specific segments to produce a customized program,
   wherein said regional-specific segments and market-specific segments contain information; and
   trafficking said transmitting and said inserting of said information to produce a customized program, said trafficking manages said information and generates bills from gathering and consolidating said information, and said trafficking utilizes a wheel program sequence.

42. A method of broadcasting a plurality of customized video programs to a plurality of receiving sites each having an associated address, the method comprising:
   encoding each of a plurality of market-specific segments with a destination address;
   transmitting a network-wide program containing regional-specific segments, and the market-specific segments to the receiving sites;
   receiving the network-wide program containing the regional-specific segments, and market-specific segments at each site;
   reading the destination addresses in each market-specific segment;
   storing at each particular receiving site the desired segments of said regional-specific segments and market-specific segments to said particular receiving sites;
   inserting the market-specific segments into the regional-specific segments to produce a customized program,
   wherein the receiving sites each have a plurality of sections having a section associated address; and
   encoding a section destination address in the market-specific segments, reading the section destination address at the receiving site, and displaying in each of said sections the network-wide program having inserted therein the market-specific segments with a section destination address matching the section associated address.

* * * * *